United States Patent
Mazza et al.

(10) Patent No.: US 6,261,629 B1
(45) Date of Patent: Jul. 17, 2001

(54) FUNCTIONAL, WATER-SOLUBLE PROTEIN-FIBRE PRODUCTS FROM GRAINS

(76) Inventors: Giuseppe Mazza, 87 Stevens Crescent, Penticton, BC (CA), V2A 8A6; Lei Gao, 2483 McGregor Drive, Penticton, BC (CA), V2A 6J2; B. Dave Oomah, 2708 Evergreen Drive, Penticton, BC (CA), V2A 8L5; Donald O'Connor, 11657 Summit Crescent, Delta, BC (CA), V4E 2Z2; Brian Crowe, 15233-92 Avenue, Surrey, BC (CA), V3R 0A8

( * ) Notice: Subject to any disclaimer, the term of this patent is extended or adjusted under 35 U.S.C. 154(b) by 0 days.

(21) Appl. No.: 09/314,109

(22) Filed: May 19, 1999

(51) Int. Cl.[7] ................. A23J 1/12; A23J 3/00
(52) U.S. Cl. ........................ 426/656; 426/618
(58) Field of Search ....................... 426/656, 618

(56) References Cited

U.S. PATENT DOCUMENTS

| | | |
|---|---|---|
| 3,689,277 * | 9/1972 | Sfat et al. . |
| 3,976,800 * | 8/1976 | Deininger et al. . |
| 5,061,497 | 10/1991 | Kovach . |
| 5,512,287 | 4/1996 | Wang et al. . |
| 5,605,577 | 2/1997 | Rayas et al. . |
| 5,637,324 | 6/1997 | Bland . |

FOREIGN PATENT DOCUMENTS

| | | |
|---|---|---|
| 860654 | 11/1977 | (BE) . |
| 4125972 | 2/1993 | (DE) . |
| 1421623 * | 1/1976 | (GB) . |
| WO 91/16447 | 10/1991 | (WO) . |
| WO 93/00826 | 1/1993 | (WO) . |
| WO 95/28850 | 11/1995 | (WO) . |

OTHER PUBLICATIONS

Mazza, G. 1998, Functional Foods: Biochemical and Processing Aspects. Technomic Publishing Co., Inc., Lancaster, PA. p. 460.

(List continued on next page.)

*Primary Examiner*—Anthony J. Weier
(74) *Attorney, Agent, or Firm*—Sim & McBurney

(57) ABSTRACT

Novel water-soluble free-flowing protein-fibre products are provided from cereal grains, such as wheat, free from starch, bran and low molecular weight degradation products thereof. Starch contaminants in soluble fractions of the cereal grains are removed by enzymatic degradation and separation. The protein to fibre ratio of the product may be modified by enzymatic treatment. Such materials are useful in a wide variety of food application.

6 Claims, 18 Drawing Sheets

Flowchart for preparation of soluble fibre-protein products from ground wheat kernel using enzymes and ultrafiltration

OTHER PUBLICATIONS

Sampson, D.A., L.A. Eckoff, S.L. Yan and K. Lorenz. 1995. Analysis of free and glycosylated vitamin B6 in wheat by high–performance liquid chromatography. Cereal Chem. 72: 217–221.

Zhou, J.R., and J.W. Erdman. 1995. Phytic acid in health and disease. Crit. Rev. Food Ser. Nutri. 35: 495–508.

Wrigley, C.W. 1996. Gluten '96. Proceedings of the Sixth International Workshop. Royal Australian Chemical Institute, Victoria, Australia. p. 544.

Faurot, A.–L., Saulnier, L., Berot, S., Popineau, Y., Petit, M.–D., Rouau, X., and Thibault, J.–F. 1995. Large scale isolation of water–soluble and water insoluble pentosans from wheat flour. Lebensm. Wiss. Technol. 28:436–441.

Oomah, B.D, and Mathieu, J.J. 1988. Functionality of commercially produced wheat flour solubles in cakes, cookies, and wieners. J. Food Sci. 53:1787–1791.

Hoseney, R.C. 1986. Cereal Starch. Pate 33 to 68 in Principles of Cereal Science and Technology, American Assoc. Cereal Chem., St. Paul, MN.

Dubois, M., Gilles, K.A., Hamilton, J.K., Rebers, P.A., and Smith, F. 1956. Colorimetric method for determination of sugars and related substances. Anal. Chem. 28:350–356.

Harland, P.D. 1989. Experimental Design in Biotechnology. Marcel Dekker, New York. p. 243.

Laemmli, U.K. 1970. Cleavage of structural proteins during the assembly of the head of bacteriophage T4. Nature 227:680–685.

Velioglu, Y.S., G. Mazza, L. Gao and B.D. Oomah. 1998. Antioxidant activity and total phenolics in selected fruits, vegetables and grain products. J. Agric. Food Chem. 46(10):4113–4117.

* cited by examiner

Figure 1. Flowchart for preparation of soluble fibre-protein products from ground wheat kernel using enzymes and ultrafiltration (Product Oct2/98, by Sorvall Lab centrifuge)
(Product Oct6/98, by Westfalia separator)

1. Sorvall lab centrifuge, 10kxg, 10min or by Westfalia separator.

Figure 2. Flowchart for preparation of soluble fibre-protein products from wheat using enzymes and ultrafiltration Figure 3. Flowchart for preparation of soluble fibre-protein products from wheat with upstream starch separation prior to gelatinization (Product Oct 30 w/o Shearzyme)

Figure 4. Flowchart for preparation of soluble fibre-protein products from wheat with upstream starch separation prior to gelatinization (Product Oct 30 w/ Shearzyme)

Figure 5. Flowchart for preparation of soluble fibrotein from wheat using Spezyme d-AA, BAN, AMG and ultrafiltration Figure 6. Flowchart for preparation of soluble fibrotein from wheat using Spezyme d-AA, BAN, AMG and ultrafiltration Figure 7. Schematic diagram showing an example of the process using distiller's solubles to produce functional products (Product Dec7/98 w/o Shearzyme)

Figure 8. Schematic diagram showing another example of the process using distiller's solubles to produce functional products (Product Dec7/98 w/Shearzyme)

Figure 9. Flowchart for preparation of soluble fibrotein from fresh Fibrotein centrate using enzyme digestion and ultrafiltration Figure 10. Flowchart for preparation of soluble fibre-protein products from Fibrotein centrate using enzyme digestion and ultrafiltration Figure 11. Flowchart for preparation of soluble fibre-protein products from Fibrotein centrate using enzyme digestion and in-UF saccharification Figure 12. Flowchart for preparation of soluble fibre-protein products under enzymatic digestion and ultrafiltration conditions.

FUNCTIONAL, WATER-SOLUBLE PROTEIN-FIBRE PRODUCTS FROM GRAINS

FIELD OF THE INVENTION

The present invention relates to the provision of highly functional, water-soluble protein-fibre products from cereal grains using processes generally involving a combination of milling, liquid-solid separation, enzymatic treatments, membrane separation and dehydration.

BACKGROUND TO THE INVENTION

Since the late 1980s, there has been a growing interest in biologically-active components in plants and animals, and in the effect that these compounds may have in preventing and alleviating human disease and promoting optimal health. The laxative properties of dietary fibre-rich wheat bran are well known. Specifically engineered food products rich in biologically-active phytochemicals may also have an important role to play in areas of protection against the so-called "chronic diseases": cardiovascular disease, diabetes, renal disease and the major cancers. Furthermore, the number of health-conscious consumers is at an all time high. Individuals are taking control of their own health, of which diet plays an important part. Functional foods, nutraceuticals and medical foods represent an exciting and rapidly growing area of Food Science and Technology (ref. 1 —a list of references appears immediately preceding the claims).

Wheat-based products manufactured by a combination of traditional and new technologies have the potential to capture a considerable share of the expanding functional foods market. Currently, foods made from wheat constitute the major source of dietary fibre in the diet of US and Canadian consumers. The accumulated science supports the association between intake of dietary fibre and bowel regularity. In addition, dietary fibre is suggested as having protective effect against colon and breast cancers.

Commercial milling of wheat into flour aims at the maximum extraction of the starch-rich endosperm with the minimum possible contamination by bran and germ, which form the by-products of the flour milling industry. Wheat germ is a unique source of highly concentrated biologically-active components. Wheat germ offers three times as much protein of high biological value and is the richest known source of tocoperhols (vitamin E) of plant origin and a rich source of agglutinin and several B-group vitamins, especially thiamin, riboflavin, niacin, pyridoxine and pantothenic acid (ref. 2). Similarly, wheat bran is a rich source of dietary fibre and phytochemicals, especially phytic acid, which is considered to be a natural antioxidant and is believed to play a role in health promotion (ref. 3). Phytic acid is also used as a complexing agent for the removal of traces of heavy metal ions and as a starting material in manufacture of inositol. Phytic acid content of cereals varies from about 0.7 to 1% and most of it is located in the bran component of wheat.

In ethanol production, starch is transformed into ethanol and carbon dioxide and other wheat constituents, such as proteins, are not utilized by fermenting yeasts and accumulate in the beerstillage. However, the proteins are denatured as a result of the heat treatment required for starch gelatinization and ethanol distillation in the process, and are used as animal feed in such forms as dried distiller's grain and solubles (DDGS), which contains about 20 to 40% protein on dry weight basis. A dry milling process may be used to facilitate the conversion of starch to dextrins and alcohol by yeast and/or enzyme.

Accordingly, phytochemicals-rich wheat germ and bran can be physically separated from each other and from the starch-rich endosperm and used as source(s) of wheat germ tocopherols, agglutinin, B vitamins, phytic acid and saponins. The endosperm fraction or flour can be used as a source of the water-soluble fibre and protein fractions. In addition, distillers dried grains and solubles (DDGS) can serve as source of valuable carbohydrate and protein fractions and biologically active secondary plant metabolites.

Proteins represent about 8 to 15% of whole wheat kernel weight and is the second most abundant group of molecules in wheat, next only to starch which accounts for up to about 80% of the kernel weight. Wheat proteins in normal wheat flour form gluten upon mixing with water and result in a dough with a unique viscoelasticity. This property has been exploited in the gluten industry where dough is washed with water and separated into starch and gluten. The starch and gluten are used in many food and non-food applications. Despite the many applications, the market value for vital wheat gluten is low and is much affected by the market demand for starch.

Wheat or its flour treated with heat loses its ability to form gluten as a result of denaturation of wheat gluten forming proteins. In traditional applications where this property is required, the lack of viscoelasticity of denatured gluten renders the proteins useless. Consequently, proteins in the downstream of wheat processing, such as ethanol production, are grossly underutilized.

Although there is an abundance of research (ref. 4) in breadmaking and other utilizations of wheat proteins where the viscoelastic properties of gluten is essential, little information is available on the production and application of soluble wheat proteins and wheat protein-fibre products.

U.S. Pat. No. 5,061,497 (Kovach) discloses a process for the production of a high-protein and high fibre bakery ingredient from cereal grains treated with alpha-amylase, followed by centrifugation and drying of the insoluble product. The objective in the Kovach disclosure is the production of a product which is not soluble in water and can be used only as a bakery ingredient.

Soluble products have been produced from the water extract of grains (refs. 5, 6). However, none of the products obtained previously were produced using a combination of enzyme treatment and ultrafiltration, purification, and concentration. As a result, these products are low in protein content, and have marginal functional properties.

SUMMARY OF THE INVENTION

The present invention is directed towards overcoming the limitations of the prior art as discussed above by providing high-protein and high-fibre products from cereal grains which can be dissolved in water and used to improve the nutritional and functional properties of a wide range of products, including food bars, soups, baked goods, breakfast cereals, sport drinks, and health-promoting foods and beverages. Additional applications of such high-protein and high-fibre products include use as an ingredient to adjust or/and modify Theological, foaming, emulsifying and antioxidant properties of food, beverages and animal feed.

In accordance with the present invention, the starch contaminants in the soluble fraction are specifically removed from cereal grains and, by using enzymes, such as the hemicellulase Shearzyme, the fibre and protein ratio in the final products can be modified, thus enhancing their functional properties.

In the present invention, a variety of products, which can be differentiated on the basis of their protein and/or fibre contents as well as their solubility, viscosity, gel strength, water absorption, foaming capacity, emulsifying capacity and/or antioxidant activity, is produced from cereal grains, especially wheat. A preferred product is one containing high levels of proteins and fibre (high protein-high fibre). However, products with a high content of proteins and a low content of fibre (high protein-low fibre), products with a low content of protein and a high content of fibre (low protein-high fibre), and products with low contents of proteins and fibre (low protein-low fibre), also may be provided herein from cereal grains.

Broadly, the present invention provides, in one aspect for the isolation of a functional protein product from a cereal grain, which comprises producing an aqueous solution of soluble protein from said cereal grain and further comprising sugars of low molecular weight less than said protein resulting from degradation of starch from said cereal grain, and effecting separation of said soluble protein from said sugars.

The separation step generally is effected by ultrafiltration to effect concentration of the aqueous solution of soluble protein in a retentate while producing a filtrate discard containing the low molecular weight sugar.

According to various embodiments of the invention, the aqueous solution which is processed to isolate the functional protein product may be prepared by a variety of procedure as illustrated in the various Figures of drawings. In general, the processing steps used to produce soluble protein-fibre products from cereal grains, including wheat, according to aspects of the invention involve a combination of core steps: 1) removal or degradation of insoluble fractions from the grain by enzymatic digestion, centrifugation and/or sedimentation; 2) recovery and concentration of the soluble fractions by sedimentation, centrifugation, and/or filtration; 3) purification of the soluble fibres and proteins by starch degrading enzymes, such as alpha-amylases and glucoamylases, as exemplified by those listed in Table 1 below; 4) optional use of fibre-degrading enzymes, such as hemicellulases, to improve the protein content in the final product; 5) separation, concentration and purification of the water soluble and functional proteins and fibres by ultrafiltration, and 6) drying of the purified and concentrated product by spray- or freeze-drying.

The process of the present invention results in a normal protein product. Accordingly, in another aspect of the present invention, there is provided a water-soluble free-flowing protein product isolated from a cereal grain and substantially free from starch and bran and low molecular weight degradation products thereof, which is characterized by a protein content of about 15 to about 60 wt %; a dietary fibre content of 0 to about 65 wt %; a solubility in water at 20° to 25° C. of about 80 to 100%; a gelation temperature of at least about 50° C.; and an apparent molecular weight as determined by SDS-PAGE of less than about 40 kDa.

Such protein product may be further characterized by a viscosity (2% aqueous solution) of about 1 to about 10 Pa; a foaming capacity of about 150 to about 800 mm/g; a foaming stability of about 35 to about 90%; an emulsifying capacity of about 135 to about 165 mL/g; an antioxidant activity of about 50 to about 120%; a water absorption of about 35 to about 325 mL/100 g; a fat content of less than about 1%; and a moisture content of less than about 10 wt %.

The protein products provided herein generally have a cream colour and a bland taste and a particulate size, such than at least 40 wt % passes a 100 mesh screen.

Depending on the procedure adopted, the product may exhibit major protein bands at about 20 and 30 kDa on an SDS-PAGE gel, major protein bands at about 27, 29 and 30 kDa on an SDS-PAGE gel or a single major protein band at about 20 kDa on an SDS-PAGE gel.

BRIEF DESCRIPTION OF THE DRAWINGS

Further aspects and advantages of the present invention will become apparent from the following description, taken together with the accompanying drawings, in which.

DESCRIPTION OF PREFERRED EMBODIMENTS

The present invention provides an industrially-applicable process for the production of functional soluble protein-fibre products from cereal grains. The invention is described specifically with respect to the recovery of such products from wheat, but the procedures are applicable to a wide variety of other cereal grains, including barley, oat, triticale, corn, rice, sorghum and millet.

A functional product provided herein is one which possesses properties that affect its utilization. The products of the present invention manifest functionality by interacting with other components of food systems. Some of the functional characteristics of the high protein-high fibre products include solubility, water binding, foaming, viscosity, gel formation, emulsifying capacity and antioxidant activity.

Figure 5:
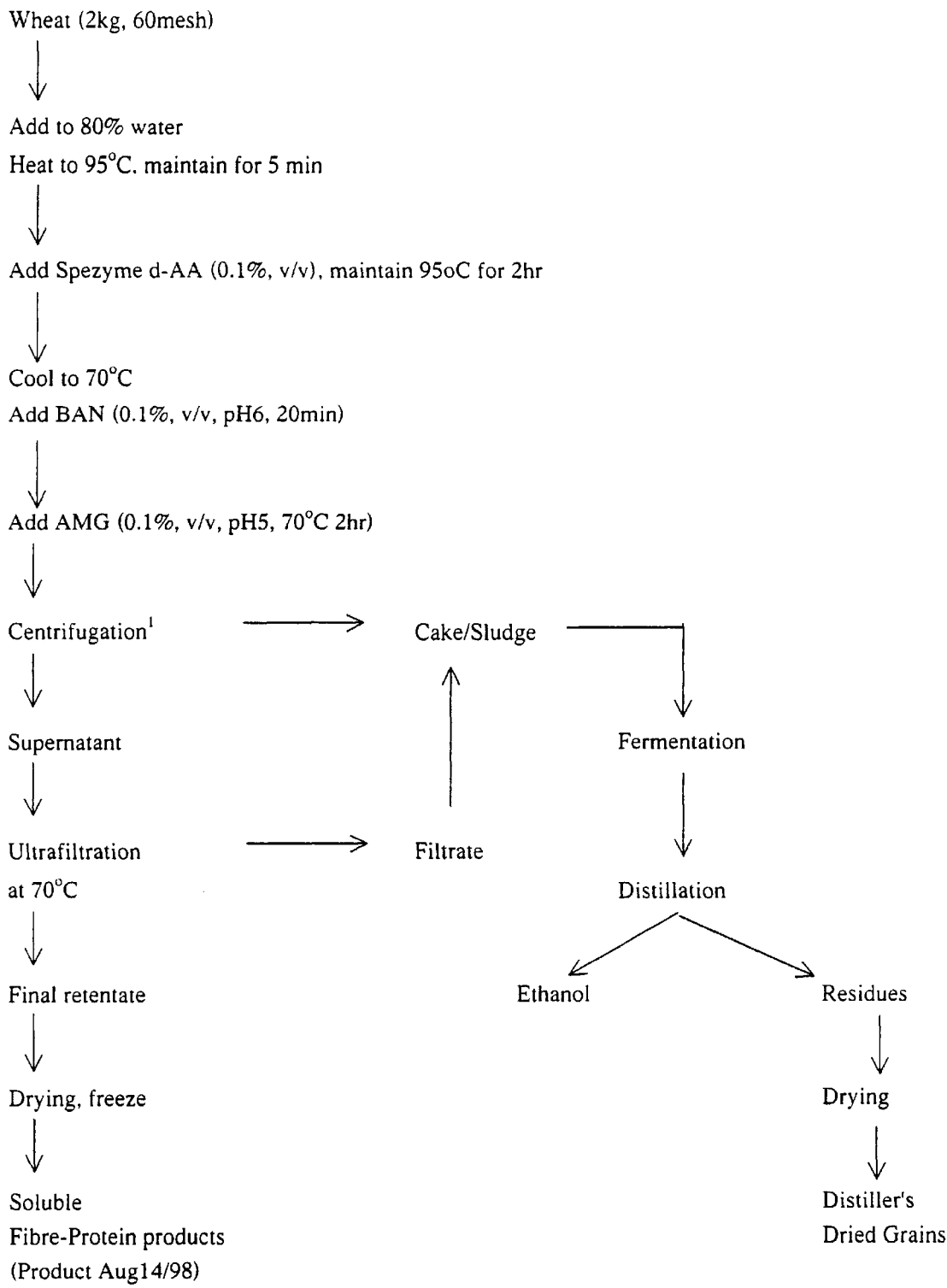
Figure 6:
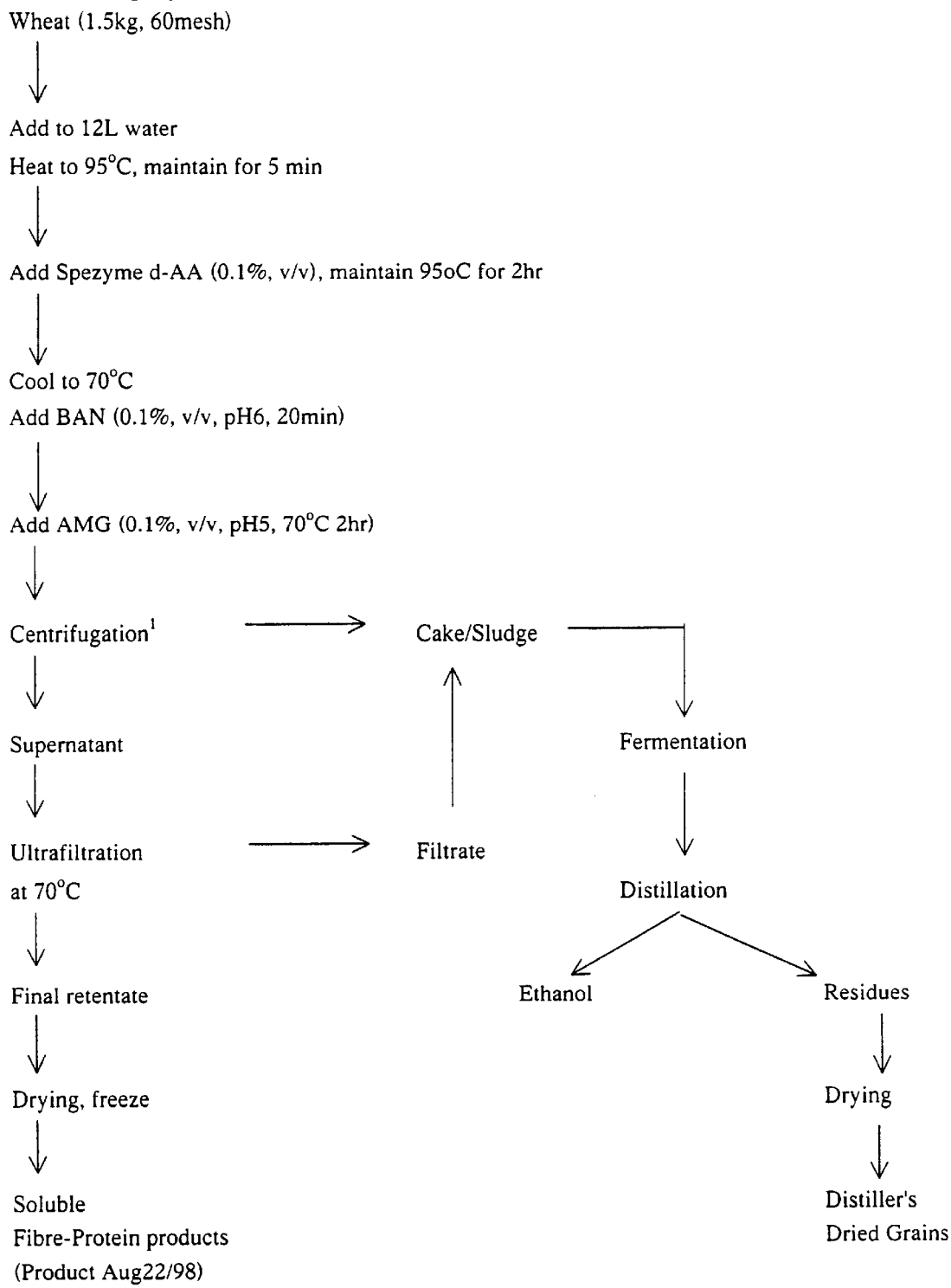
Figure 7:
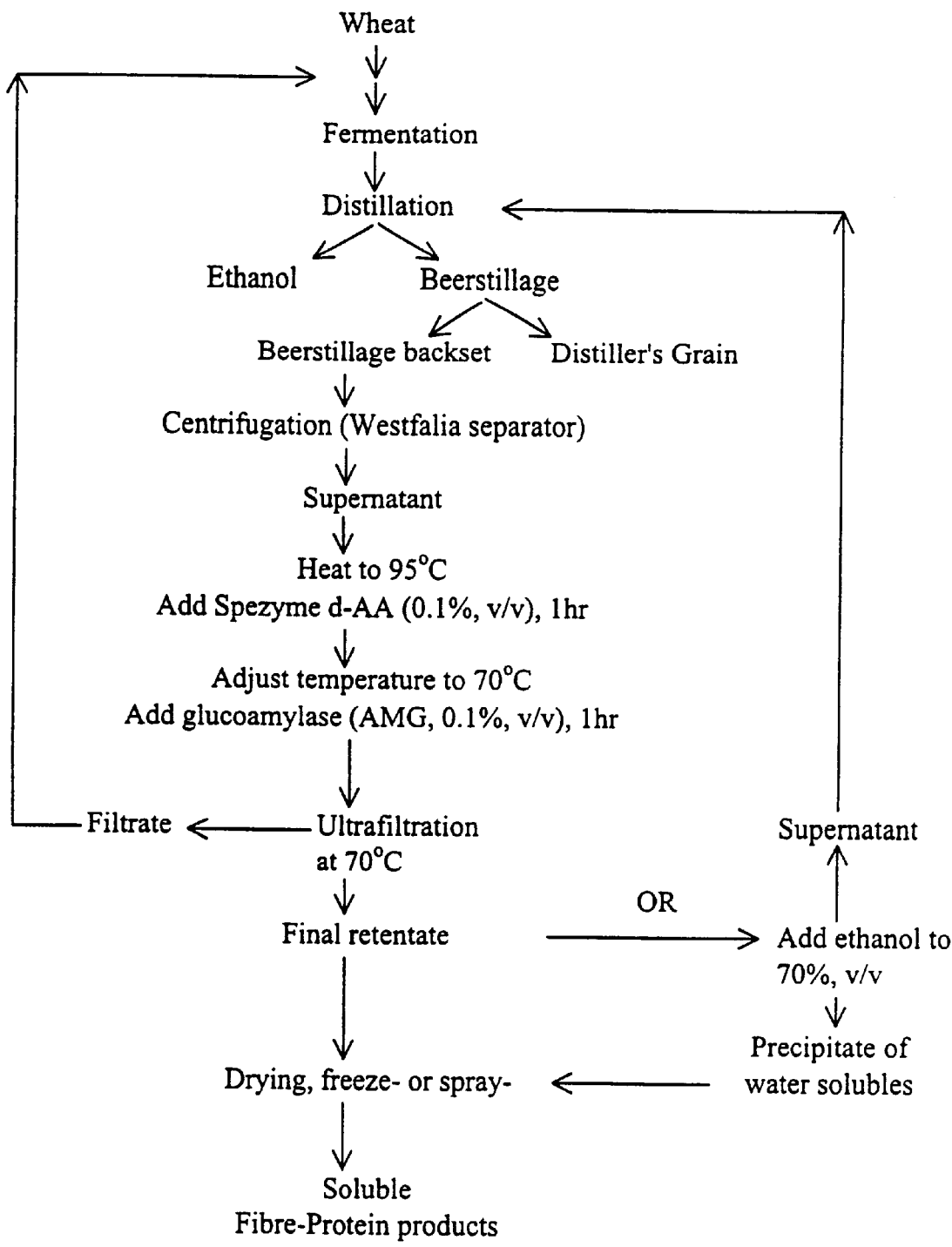
Figure 8:
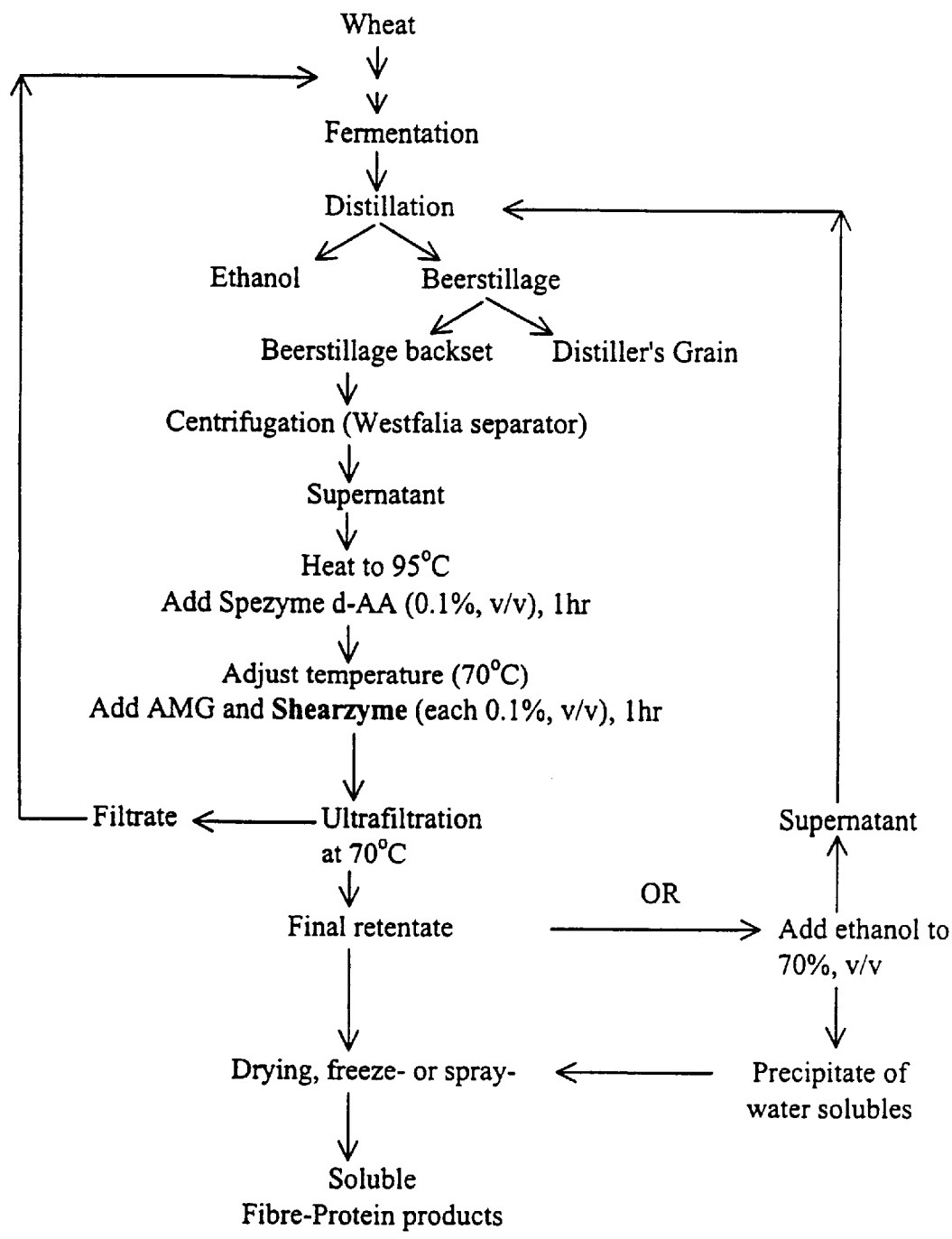
Figure 9:
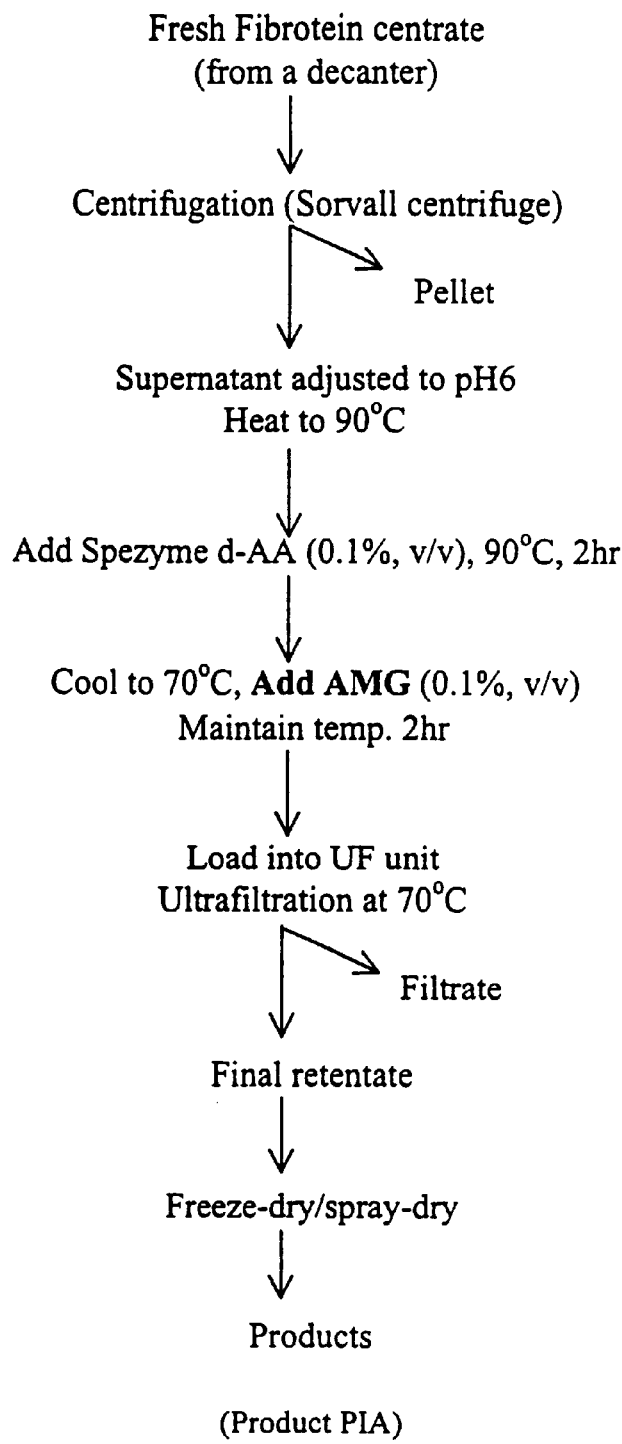
Figure 10:
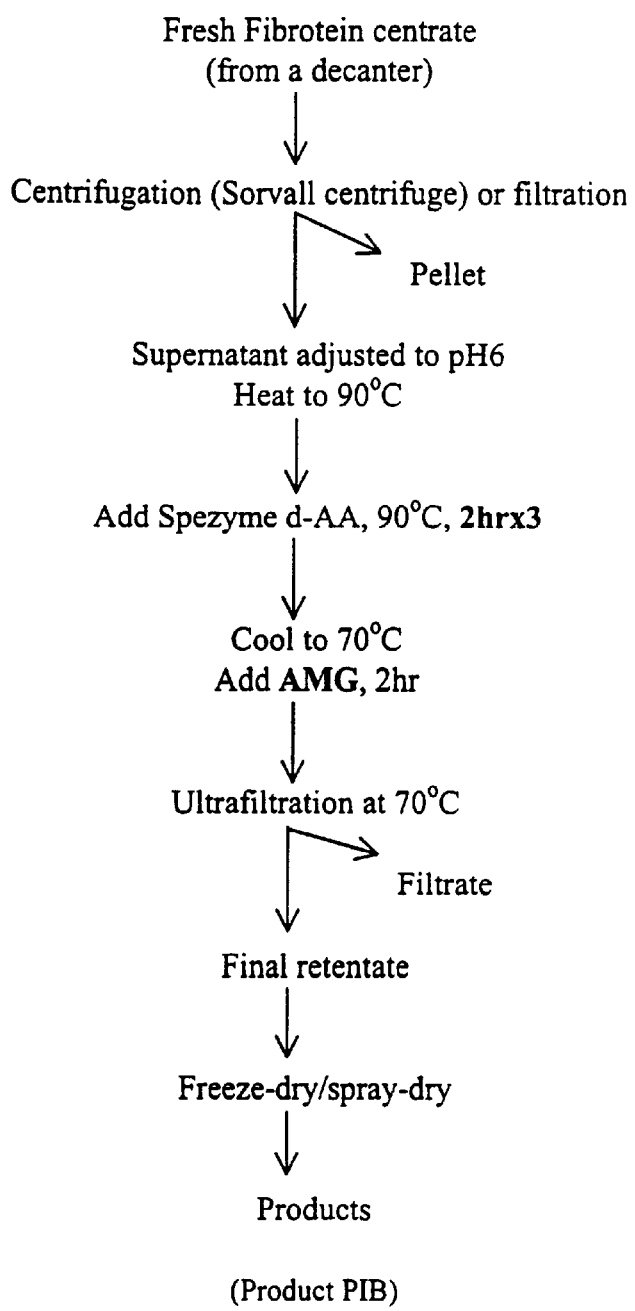
Figure 11:
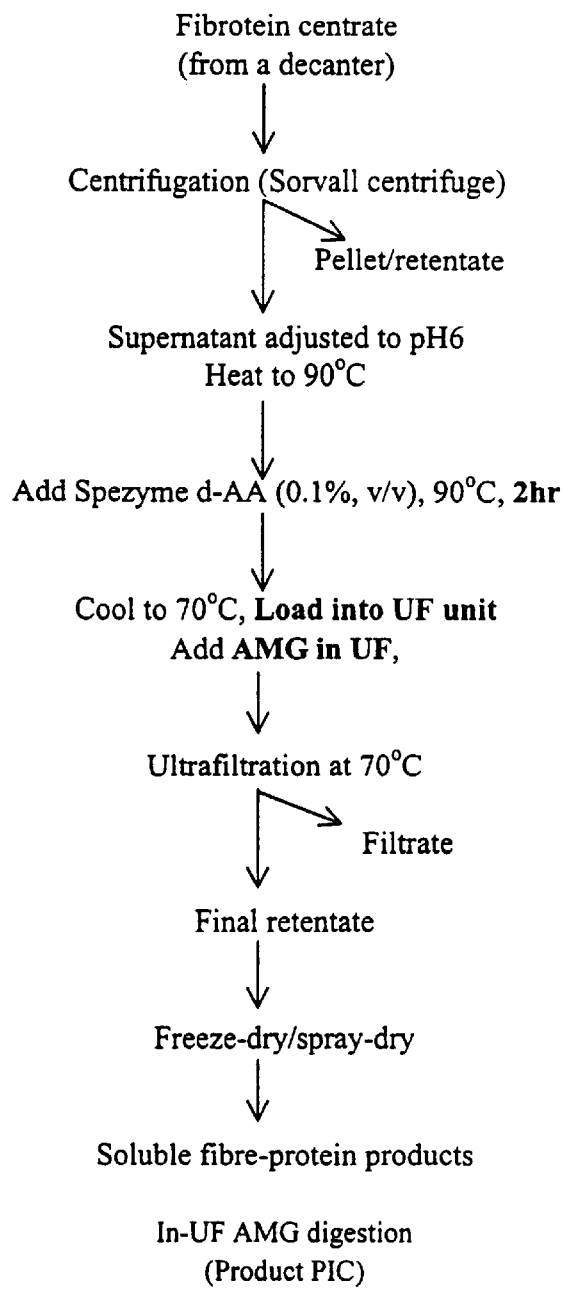
Figure 12:
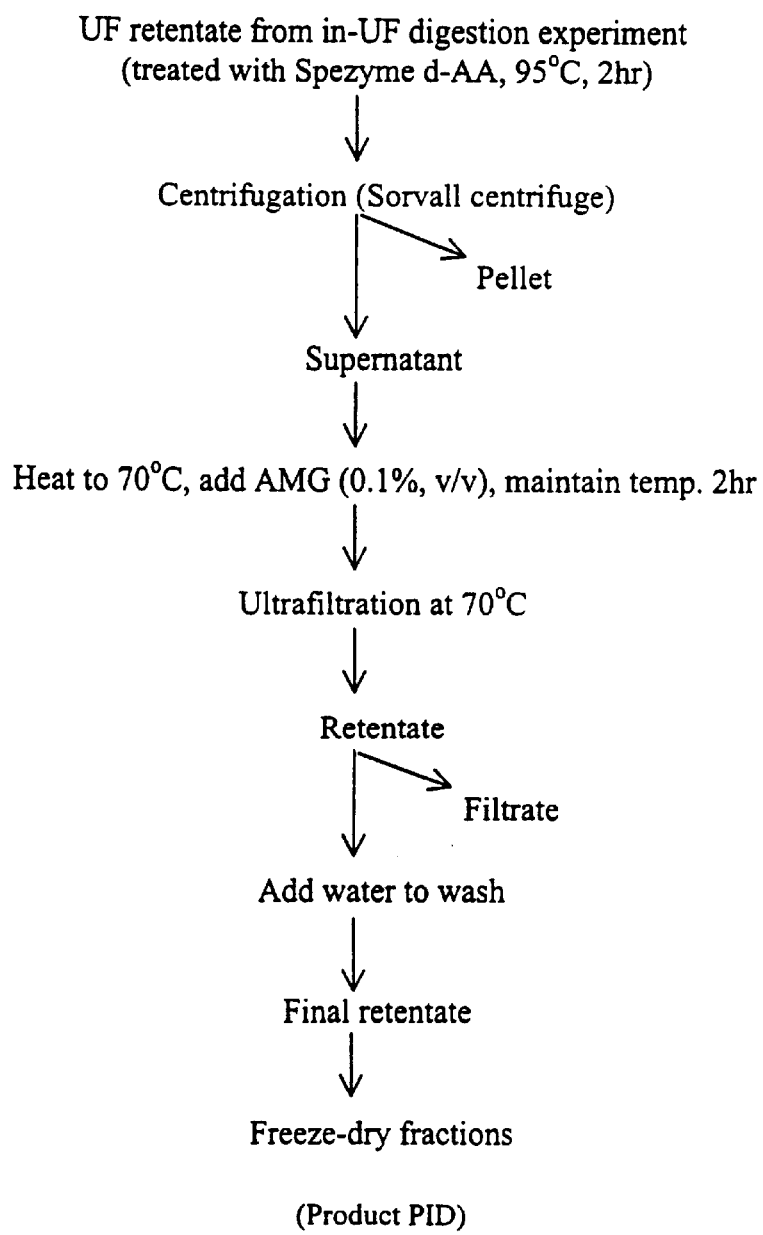

The alternative processes as examples for production of soluble protein-fibre products are outlined in FIGS. 1 to 6 for preparation of soluble protein-fibre products using wheat kernels or other starch and protein-bearing grains as the starting material and FIGS. 7 and 8 for processes from fermented distiller's solubles. Products from Fibrotein centrate are produced according to the processes shown in FIGS. 9 to 12. The processes illustrated in FIGS. 1 to 12 demonstrate the flexibility and adaptability of the procedures described herein for preparing a wide variety of products from diverse starting materials.

The major steps for all the processes outlined in FIGS. 1 to 12 are discussed below:

Enzymatic Digestion

Figure 1:
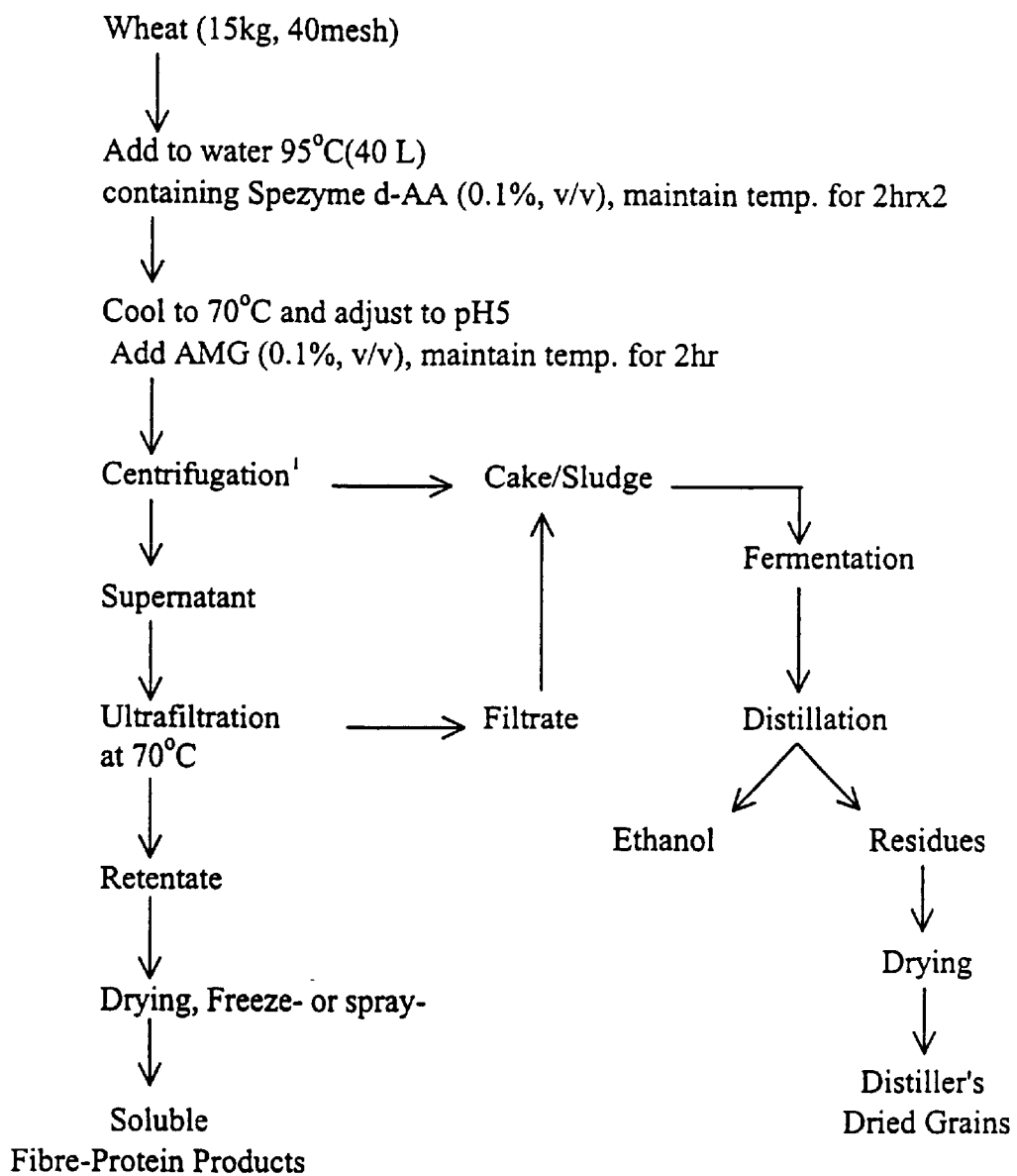
FIGS. 1 to 12 are schematic flow charts showing specific examples of individual processes for obtaining protein-fibre products from different starting materials and under varying enzyme, purification and concentration conditions according to specific aspects of the invention and as described in detail below.
Figure 2:
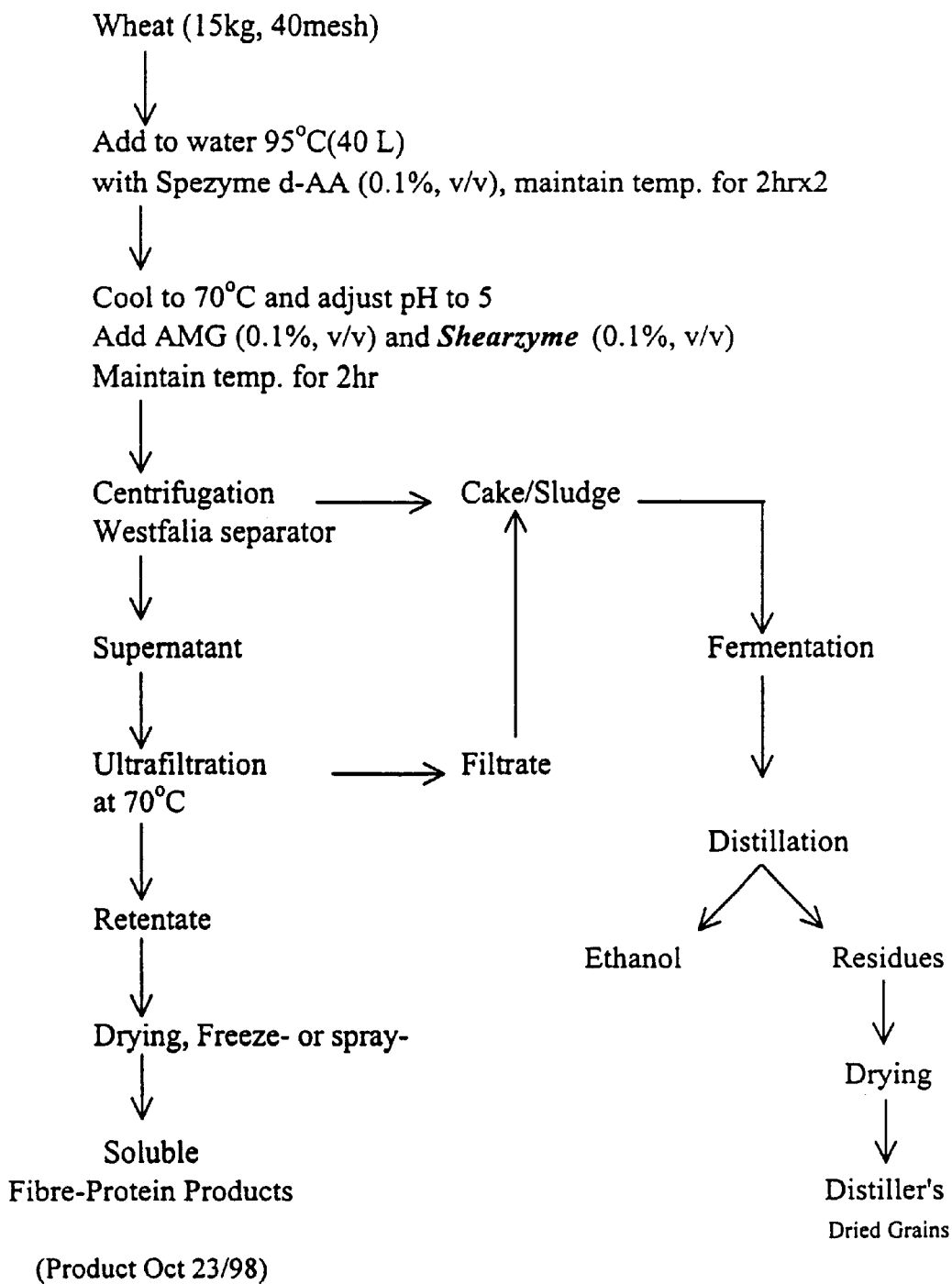

In the processes illustrated in FIGS. 1 and 2, ground wheat is added to heated water (about 95° C.) containing a dissolved alpha-amylase, for example, Spezyme delta AA. The high temperature is used to gelatinize and liquefy the starch fraction of wheat under optimum conditions for enzymatic activity to prevent excessive viscosity increase in the mash. The temperature of the heated water is selected based on the optimum temperature and stability of the specific enzyme employed and the requirement of a temperature above the gelatinization temperature of starch. Since Spezyme delta AA has an optimum temperature around 95° C. (see Table 1), this enzyme is ideally suited for the current processes, because complete starch gelatinization usually requires a temperature above about 80° C. (ref. 7). Any other α-amylase functional at such temperatures may be employed. Continuous stirring is used to prevent localized uneven heating and enzyme denaturation.

Since starch liquefaction by alpha-amylase produces relatively large size molecules (dextrins), treatment by enzymes, such as glucoamylase, for example, AMG, is used to further decrease the size and viscosity of liquefied starch, so that the subsequent ultrafiltration step may easily separate the large protein and fibre molecules from the small sugars by molecular size. The glucoamylase AMG has an optimum temperature of about 70° C. and optimum pH range of about 4.0 to 5.0. The mash is, therefore, cooled from about 95° C. to about 70° C. to create optimum conditions for use of this enzyme. In addition, the pH of the mash is adjusted to the range for optimum enzyme activity. Corresponding adjustments in temperature and pH may be made depending on the glucoamylase selected.

Figure 13:
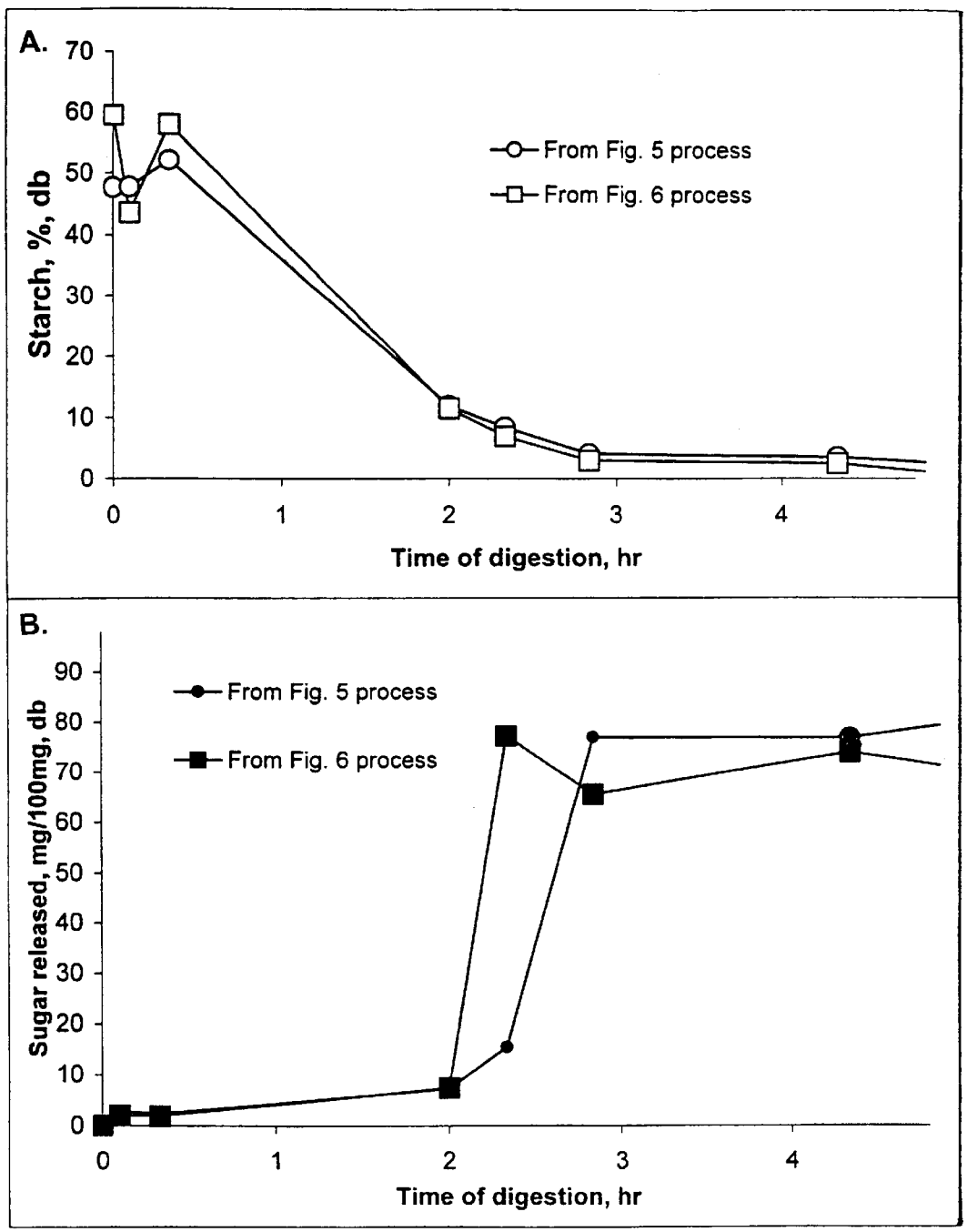
FIG. 13, having panels A and B, shows the digestion of starch (panel A) and the release of sugars (panel B) from wheat using enzymatic digestion.

The release of sugars from the enzymatic digestion (FIG. 13, panel B), as determined by the phenol-sulfuric acid method (ref. 8), is not a direct indication of undigested starch in the materials since the contents of soluble fibre and proteins are unknown. However, it is an indirect marker or index of the starch degradation, as evidenced by the increasing sugar content of the solids, shown by the results for starch determination by the AACC method (FIG. 13, Panel A). Therefore, it is desirable to treat the wheat mash longer with alpha-amylase. Alternatively, a second dose of alpha-amylase can be added to the mash and the digestion extended for two extra hours to ensure complete starch liquefaction.

In addition to the use of the amylolytic enzymes to liquefy the starch, hemicellulase enzymes, such as Shearzyme (a xylanase from Novo), may be used to treat the protein component of the cereal grain to produce soluble protein-fibre products with varying chemical, physical and functional properties. Any residual enzyme activity in the final product after ultrafiltration (UF) purification can be inactivated by heat treatment according to the manufacturers' instructions, if desired.

For example, Shearzyme or other hemicellulase, is used in the process outlined in FIG. 2 to remove fibre and to increase the protein content of the final soluble protein-fibre product. Shearzyme has an optimum temperature of operation of 70° C., similar to that for AMG, and hence both enzymes can be conveniently used together to hydrolyze dextrins and fibres simultaneously. However, depending on the optimum temperature of use, the hemicellulase treatment to hydrolyze fibres may be effected separately from the glucoamylase treatment to hydrolyze dextrins. Fibre molecules, such as arabinoxylans, a major soluble dietary fibre in wheat and other cereals with xylan as their backbone, are degraded by the hemicellulase into smaller molecules. Some of these molecules are small enough to pass through the UF membrane and hence are removed by the UF process step, thereby enriching the protein fraction in the final retentate.

For example, treatment by Shearzyme for 2 hr at 0.1 L/100 L clarified extract increased the protein content of the final product from 24% to 31% (db) (see Table 2).

Enzymatic digestion in the present invention, therefore, is carried out mainly to remove unwanted starch fractions and, as a result, to purify the soluble fibre and protein components of wheat. However, enzymatic digestion further can be effected to reduce the fibre content and increase the protein content of the final product.

Figure 3:
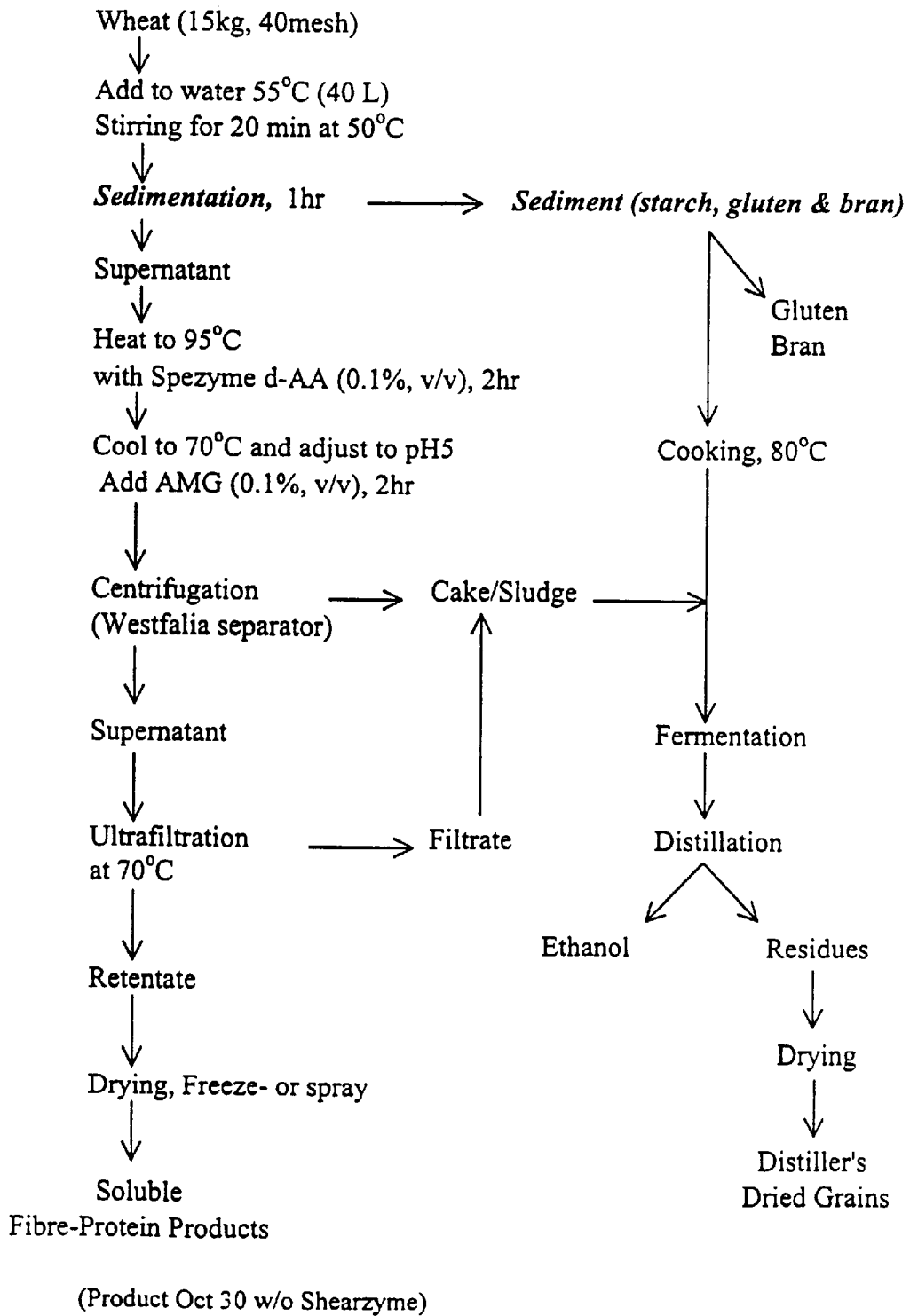
Figure 4:
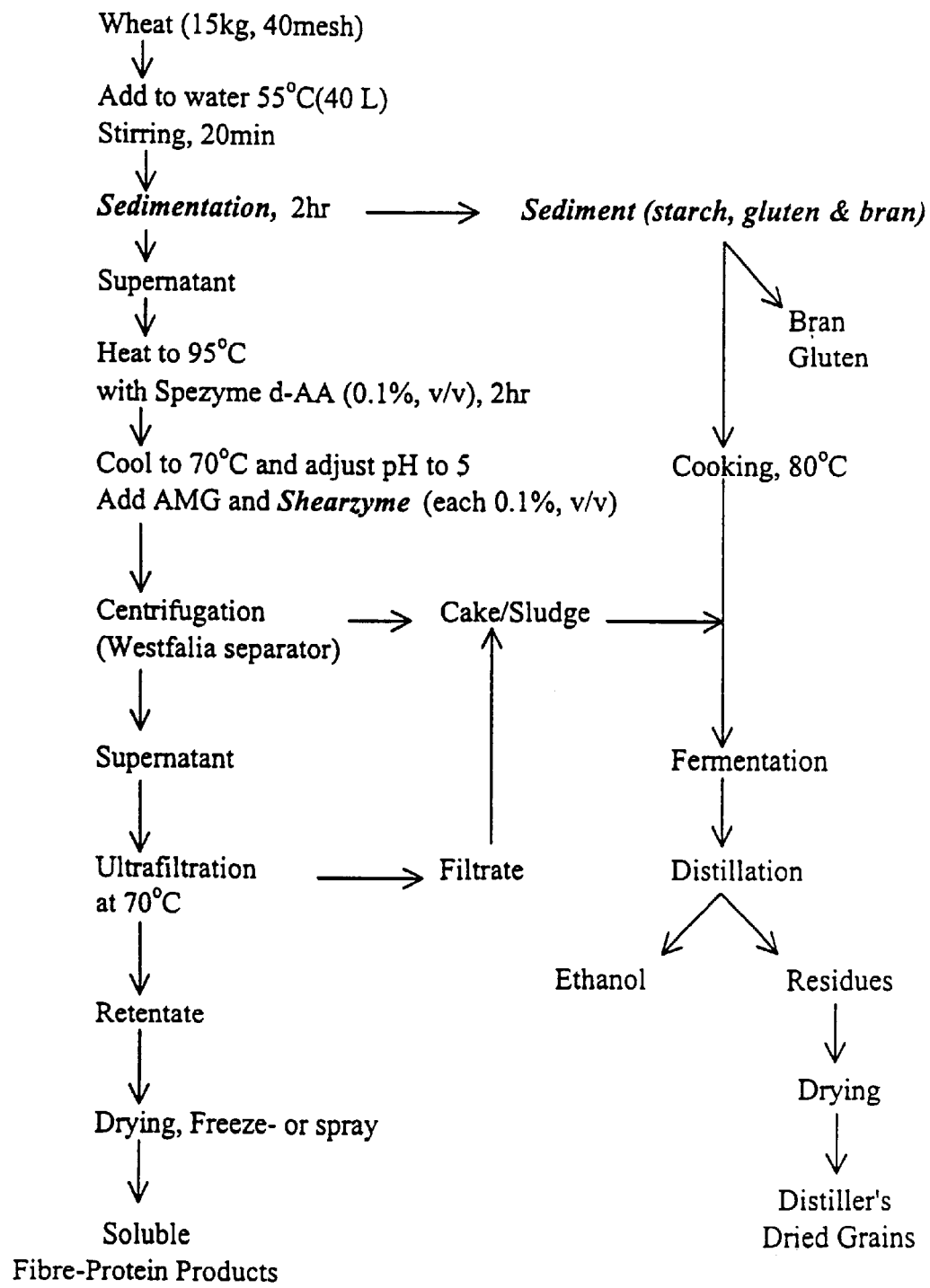

Two strategies have been used by the inventors to hydrolyze the starch in the raw materials for soluble protein-fibre production. The first has been to gelatinize all the starch in wheat by hot mashing, followed by exhaustive digestion by alpha-amylases, beta- or glucoamylases, as described above with respect to the embodiments of FIGS. 1 and 2. The other strategy is to separate most of the starch from the protein and fibre prior to starch gelatinization, and subsequently hydrolyze only the residual starch in the extract by the enzymes. This alternative is illustrated in FIGS. 3 and 4, and described in more detail below.

Enzymes which may be used in the processes described herein, their functions and properties are listed in Table 1 below. The amount of enzyme required in the processes is approximately 0.1% (v/v, wet basis) of the ground wheat-water dispersion. The temperature and pH of the materials has to be adjusted for optimal enzyme activity, for maximum efficiency and economy, depending on the enzyme chosen. The purpose of using amylases is to digest the starch into sugars which are then removed by ultrafiltration. It is undesirable for the enzymes to possess contaminating enzymes with proteolytic activity which may reduce the yield of protein.

Centrifugation

Centrifugation is carried out to separate the soluble fraction from the wheat mash suspension. When wheat kernel is used as the starting material, as in the case of the embodiments of FIGS. 1 to 6, a large amount of the solids, including bran and coagulated gluten, sediment readily. The solids are removed using a finisher (such as a Model 185SC finisher manufactured by Square D Company of Indianapolis, Ind.) before centrifugation using a centrifuge, such as the Westfalia separator which handles materials with low suspended solids more efficiently. Separation by a finisher is based mainly on size and not on gravity difference as in centrifugation. Other types of filtration process can be used to achieve the same objective, namely to separate the insoluble components from the soluble material. Products produced by different centrifugation methods show only small differences in chemical, physical and functional properties (see Tables 2 and 3 below). The cake/sludge separated by the centrifugation step may be further processed, as illustrated in the Figures, to isolate useful products therefrom.

Ultrafiltration (UF)

Ultrafiltration is a pressure-driven membrane process which is used to remove most of the water, sugars, and other low molecular weight compounds (generally less than 10 kDa) produced from enzymatic digestion in the clarified supernatant from the solids separation step. Consequently, the fibre and proteins dissolved in the supernatant are greatly enriched and purified by the ultrafiltration step. Depending on the molecular weight of the sugars and other small molecules in the clarified supernatant from the solids separation step, the ultrafiltration step may be effected using a membrane having a molecular weight cut-off from about 5 to 15 kDa. The filtrate from the UF step may be circulated to the by-product processing operation, as illustrated. The advantages of UF over other molecular separation and concentration processes (for example, chromatography, evaporation) result from the characteristics that no change of phase or state of the solvent occurs and no interphase mass transfer is involved. In addition, no heat is required for the process. These advantages result in energy savings and help produce bioproducts with functional properties superior to those produced by other processes.

The UF unit used for most of the experimental work described herein was a Niro model DDS LAB 20 equipped with polysulphone membranes (10 kDa MWCO) and which was connected to a hot water bath (70° C.) to control the temperature of the material being ultrafiltered. Other membranes, including regenerated cellulose (MWCO 5 and 10 kDa), polyethersulfone (MWCO 10 kDa) and polysulfone (MWCO 10 kDa) (Amicon Canada, Oakville, ON), were also tested and found satisfactory for effecting the ultrafiltration step. The elevated temperature used for the UF step was employed to assist in the break down of residual starch by enzymes and to increase UF flux. In general, however, the ultrafiltration step may be effected at a temperature from about 60 to about 80° C. and a cross-membrane pressure of about 3 to about 6 bar, using any convenient equipment and membranes.

Process variables, including operating temperature, pressure and cross flow (pump setting), were optimized for the experimentation described herein by a response surface method (Box-Behnken design, BB0316) as described by ref. 9, using a laboratory ultrafiltration unit (TCF10, Amicon Canada, Oakville, ON). In preliminary runs with the DDS LAB20 UF unit, a temperature of 60 to 80° C. and a pressure of 1.4 to 2.4 bar (20 to 35 psi) were used. In routine UF runs, a cross-membrane pressure value in the range of about 3 to about 6 bar was used since flux was found to be proportional to average pressure within this range.

Drying of Final Products

The thick, yellow to brown final retentate product from UF, which may be used directly as a food ingredient, if desired, may be dried by any convenient procedure, including freeze-and/or spray-drying. Spray-drying is fast and efficient, and produces a fine, free-flowing particulate product with bland flavour and light, creamy colour. Comparison of major functional properties of freeze- and spray-dried products indicated that spray-drying does not alter the functional properties of the products.

In other embodiments of the present invention, wheat starch is not initially gelatinized. Instead, ungelatinized starch and coagulated gluten are first separated from the wheat mash as a fraction from the solubles. The soluble fraction then is used to produce the highly functional protein-fibre products of the invention.

FIGS. 3 and 4 are flowcharts for preparation of soluble protein-fibre products from wheat with upstream starch separation prior to gelatinization. The soluble fraction from an aqueous extraction of wheat carried out below the gelatinization temperature of starch, generally from about 80 to about 85° C., is used to produce the highly functional protein-fibre products (see Tables 2 and 3 discussed below). Most of the starch and gluten proteins are separated into a solid fraction from the aqueous extraction, which is separated, such as by sedimentation, from the aqueous extract. The solid fraction may be further fractionated into starch, bran and gluten, or otherwise processed, as illustrated in FIGS. 3 and 4.

Because most of the starch in the wheat is removed in the initial fractionation step, the processes in FIGS. 3 and 4 require a lower enzyme level and/or a shorter time for hydrolyzing the residual, smaller amount of starch during purification of the soluble protein-fibre fraction, than is the case with the procedures described above for FIGS. 1 and 2. The enzymatic digestions are effected in the manner described above with respect to FIGS. 1 and 2, to degrade residual starch. Following the enzyme treatments, residual solids are separated from the soluble fraction and the steps of ultrafiltration and drying are carried out as described for the procedures of FIGS. 1 and 2.

The difference between the schematics shown in FIGS. 3 and 4 is the use of the hemicellulase Shearzyme in the latter, similar to the procedure of FIG. 2. The comparison of the two processes demonstrated that Shearzyme is useful for enriching the protein content of the products. When Shearzyme treatment is used in the process for 2 hr at 0.1% level (FIG. 4), the protein content of the final product increases from 41 (without Shearzyme) (FIG. 3) to 51% (db) (with Shearzyme) (Table 2). As a result, the carbohydrate content decreases from 52 to 42% for the two products.

Processes outlined in FIGS. 5 and 6 illustrate two other examples of the use of enzymes and ultrafiltration for the production of highly functional products. In these two processes, a combination of the $\alpha$-amylases Spezyme d-AA and BAN and the glucoamylase AMG is used, but otherwise the procedures are the same as in FIGS. 1 and 2. The wheat fraction is not affected in its suitability for use as a substrate for ethanol production. The filtrate as a co-product may be used in fermentation for ethanol production.

Distiller's solubles have a strong yeasty flavour characteristic of the beerstillage. However, the soluble protein-fibre products from beerstillage or distiller's solubles produced using the procedures of the invention and described below are very similar to those obtained directly from wheat or other unfermented processing streams. The products also have a creamy colour and a bland flavour. The processing conditions are thus very effective in removing the undesirable contaminants and purify soluble fibres and proteins present in beerstillage.

The use of distiller's solubles for preparing functional products according to the invention is illustrated in processes outlined in FIGS. 7 and 8, without and with Shearzyme or other hemicellulase, respectively. Since the starch has been essentially depleted by yeast fermentation, the distiller's solubles is similar to a water extract of wheat flour, and has low starch load that requires minimal enzyme digestion for purification of the soluble protein-fibre product, as in the case of the processes of FIGS. 3 and 4. The processes described herein using distiller's solubles as raw materials for the preparation of functional soluble protein-fibre products also have the advantage of reducing the cost of ethanol fermentation by recycling the filtrate from the ultrafiltration step to the fermentation step, which reduces consumption of water and yeast food in the fermentation, and of achieving a more complete conversion of wheat starch into ethanol. In this embodiment, as seen in FIGS. 7 and 8, ethanol from the distillation step, or other source, may be added to the retentate from the ultrafiltration step to precipitate the water solubles from the retentate, thereby further concentrating the soluble protein-fibre product. The supernatant from any such precipitation step may be recycled to the distillation step.

In additional embodiments of the present invention, fibrotein centrate, a processing stream from existing ethanol producing plants, may be used to produce the highly functional fibre-protein products of the invention. Fibrotein centrate is essentially mashed/cooked ground wheat with most of the bran and gluten fraction removed by low speed (decanter) centrifuge.

FIGS. 9, 10, 11 and 12 are flowcharts for the preparation of soluble protein-fibre products from fresh fibrotein centrate using enzyme digestion and ultrafiltration, using the materials and conditions described above with respect to FIGS. 1 and 2, following an initial centrifugation to remove solids. Fibrotein centrate yields soluble protein-fibre products with protein contents of 24 to 30% (Table 2, PIA and PIB), depending on the duration of enzyme treatment. A two-hour treatment (FIG. 9) with the alpha-amylase Spezyme delta AA yields product PIA, which has a protein content of 24% (Table 2) while a six-hour treatment with the same alpha-amylase (FIG. 10) yields product PIB with a protein content of 31%. (Table 2).

When digestion of the wheat starch by a glucoamylase enzyme, such as AMG (see Table 1), is carried out during the ultrafiltration step (FIG. 11) to reduce the time required to separate and concentrate the soluble fibre-protein, the resulting product (PIC) has a protein content of 24% (Table 2), which is slightly lower than those from the out-of-UF digestion processes (Table 2, PIA and FIB). However, more vigorous treatment of the material with amylases (FIG. 12) produces products with very high protein content (PID, 40%, Table 2).

Fibrotein centrate previously frozen prior to preparation of the soluble functional products results in products with lower protein (about 17%) and high starch contents. This is probably a result of resistant starch formation during freezing and thawing processes. Therefore, it is preferable in the present invention that any wheat material should be processed quickly after starch gelatinization to minimize the formation of resistant starch, particularly if a high protein product is desired.

The soluble protein-fibre products resulting from the procedures specified herein, when dried, are characterized by a protein content ranging from about 18% to about 51%, depending on the process conditions used, a total dietary fibre of 4 to 60% and a solubility in water of over about 84 to 100% at room temperature (22 to 25° C.). Other characteristics of the preferred product include the following properties: viscosity (2% solution), about 1 to 9 Pa s; foaming capacity about 180 to 767 mm/g; foaming stability about 38 to 85%; emulsifying capacity about 141 to 161 mL/g; antioxidant activity, about 53 to 118% (with alpha-tocopherol at 100 mg/L in methanol as standard); water absorption, about 38 to 311 mL/100 g; colour, cream; taste, bland; particle size, 40% through 100 mesh; fat content, less than about 1%.

The physical and chemical properties of the prepared fibre and/or protein-rich products from different wheat materials using the procedures of the various Figures of drawings are presented in Tables 2 and 3 below. The results obtained using the various procedures described herein clearly show that the processes of the invention are capable of producing a wide variety of dietary fibre and/or protein-rich products, depending on the starting material and procedures used.

Among the products which may be produced by the processes of the invention are products containing high levels of proteins and fibre (high protein-high fibre), products with a high content of proteins and a low content of fibre (high protein-low fibre), products with a low content of protein and a high content of fibre (low protein-high fibre), and products with low contents of proteins and fibre (low protein-low fibre). In general, the products may be categorized as shown in Table 6 below.

Fibre and protein are the major components of most products, accounting for up to 90% of the products on a dry basis (db). Essentially, all the fibre present in the products is soluble fibre (see Table 2). Moisture contents of all products are from about 3 to 6%, indicating effective drying by either the spray-or the freeze-drying method used. The spray-dried materials are free-flowing powder products, with bland flavour and slightly creamy colour.

Figure 14:
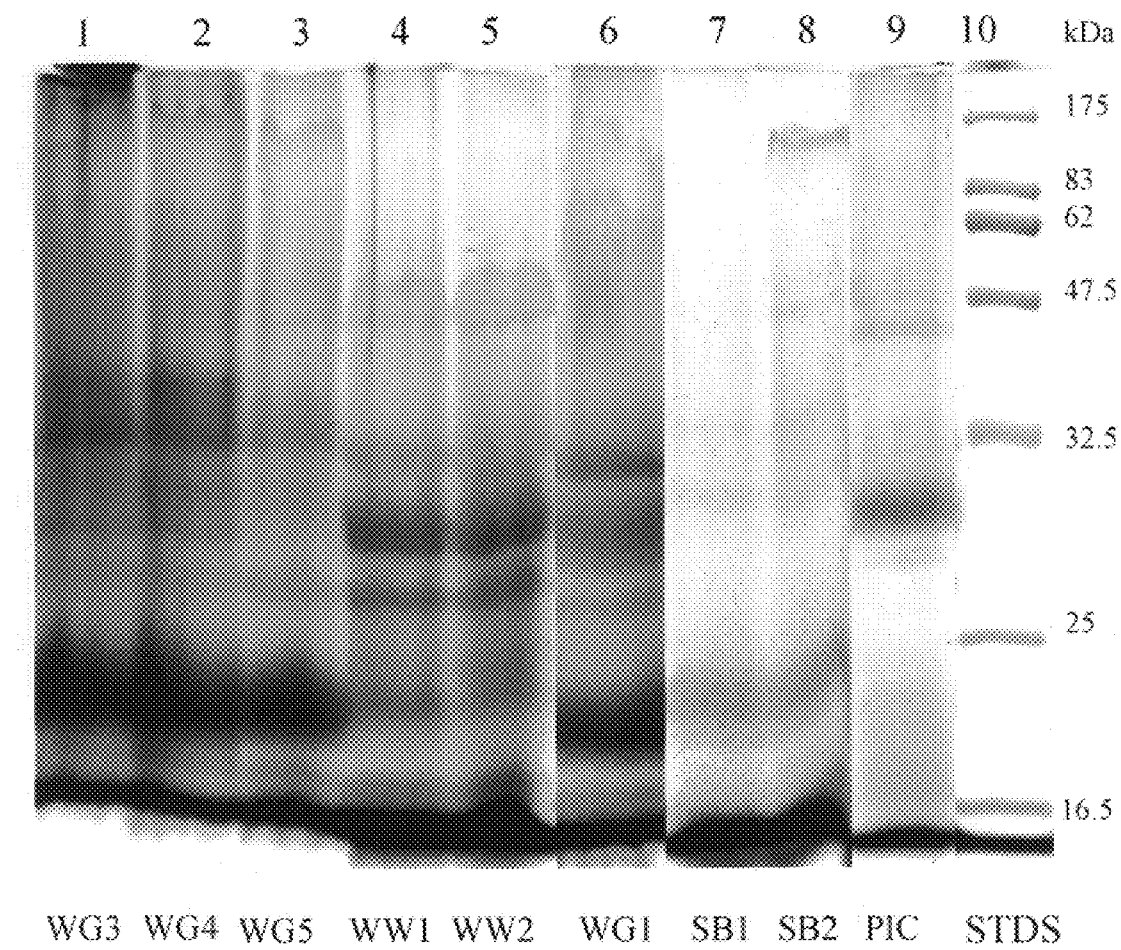
FIG. 14 is an SDS-PAGE analysis of selected products produced in accordance with embodiments of the invention. Lanes: 1, WG3; 4, WG2; 3, WG5; 4, WW1; 5, WW2; 6, WG1; 7, SB1; 8, SB2, 9, P12; 10, molecular weight.

Electrophoretic results indicate that the major proteins of the products had molecular weights consistently below 40 kDa (FIG. 14). Products from different starting materials and procedures show different compositions, as revealed by differences in protein band distribution in SDS-PAGE gel analysis. SDS-PAGE analysis was carried out using a 12 wt % polyacrylamide gel generally according to the procedure of Laemmli (ref. 10).

There are two major protein bands, with approx. MWs of 20 and 33 kDa, in the soluble fibre-protein products (WG3, WG4) prepared from mashed wheat kernels without the use of Shearzyme (FIG. 14, Lanes 1 and 2). With Shearzyme treatment (WG5), however, the intensity of the 33 kD protein is greatly reduced, as indicated by the much fainter band (FIG. 14, Lane 3), suggesting that this protein is either aggregated with a xylan or is a glycoprotein susceptible to Shearzyme treatment.

The proteins of products from the wheat extract prior to starch gelatinization (WW1, WW2) showed a different protein distribution (FIG. 14, Lanes 4 and 5). They are essentially devoid of the 33 kDa protein, but contained another group of proteins with MWs of 27, 29 and 30 kDa, respectively, with those of 29 kDa being the most abundant, as indicated by the strong band intensity. In addition, these products have low levels of the 20 kDa protein (cf. Lanes 1, 2 and 3). Shearzyme treatment does not alter the band distribution of proteins (compare Lanes 4 and 5). Since the products are from wheat extracted with water at relatively low temperature, those bands are probably a result of endogenous protease(s) activity which hydrolyze certain wheat proteins.

The products from the processes involving the use of the α-amylase enzyme BAN (WG1) show qualitatively similar patterns (FIG. 14, Lane 6) to those from the water extract of wheat (Lanes 4 and 5). This is probably due to the presence of protease in the BAN enzyme.

The products prepared from beerstillage (SB1, SB2) show a different protein distribution (FIG. 14, Lanes 7 and 8) from those prepared from mashed wheat kernels. Essentially, these products contained only the 20 kDa protein. There is extensive use of α- and gluco-amylases, proteases and xylanases in the production of ethanol. These enzyme treatments are expected to cause substantial degradation of the proteins as well as fibres. The results show that products from beerstillage contain only small protein molecules of smaller than 20 kDa and further Shearzyme treatment does not change their protein composition (compare Lanes 7 and 8).

Figure 15:
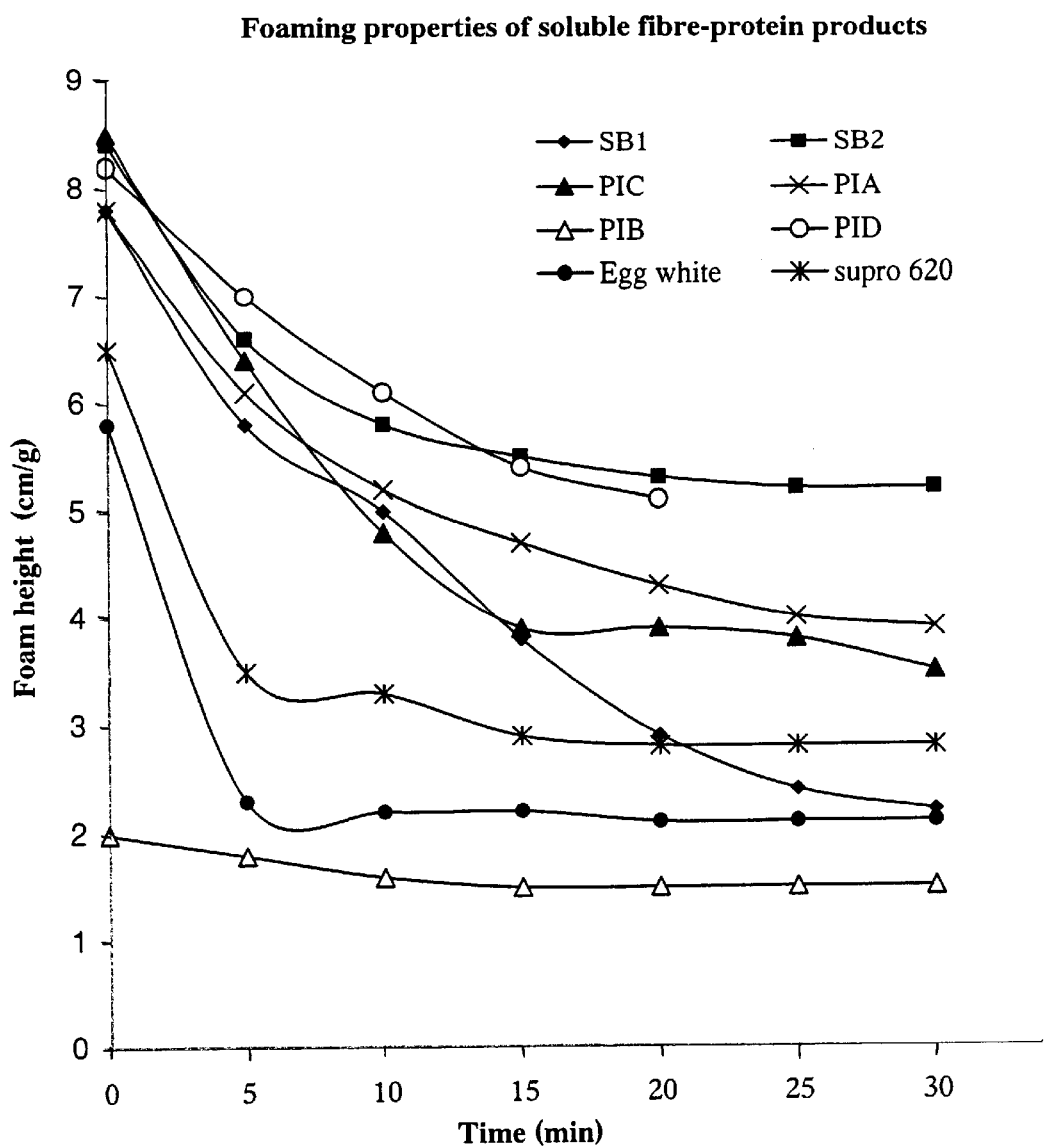
FIGS. 15 and 16 show graphically the foaming properties of certain specific soluble protein-fibre products produced in accordance with embodiments of the invention, in comparison to protein from a soy bean isolate and egg white.
Figure 16:
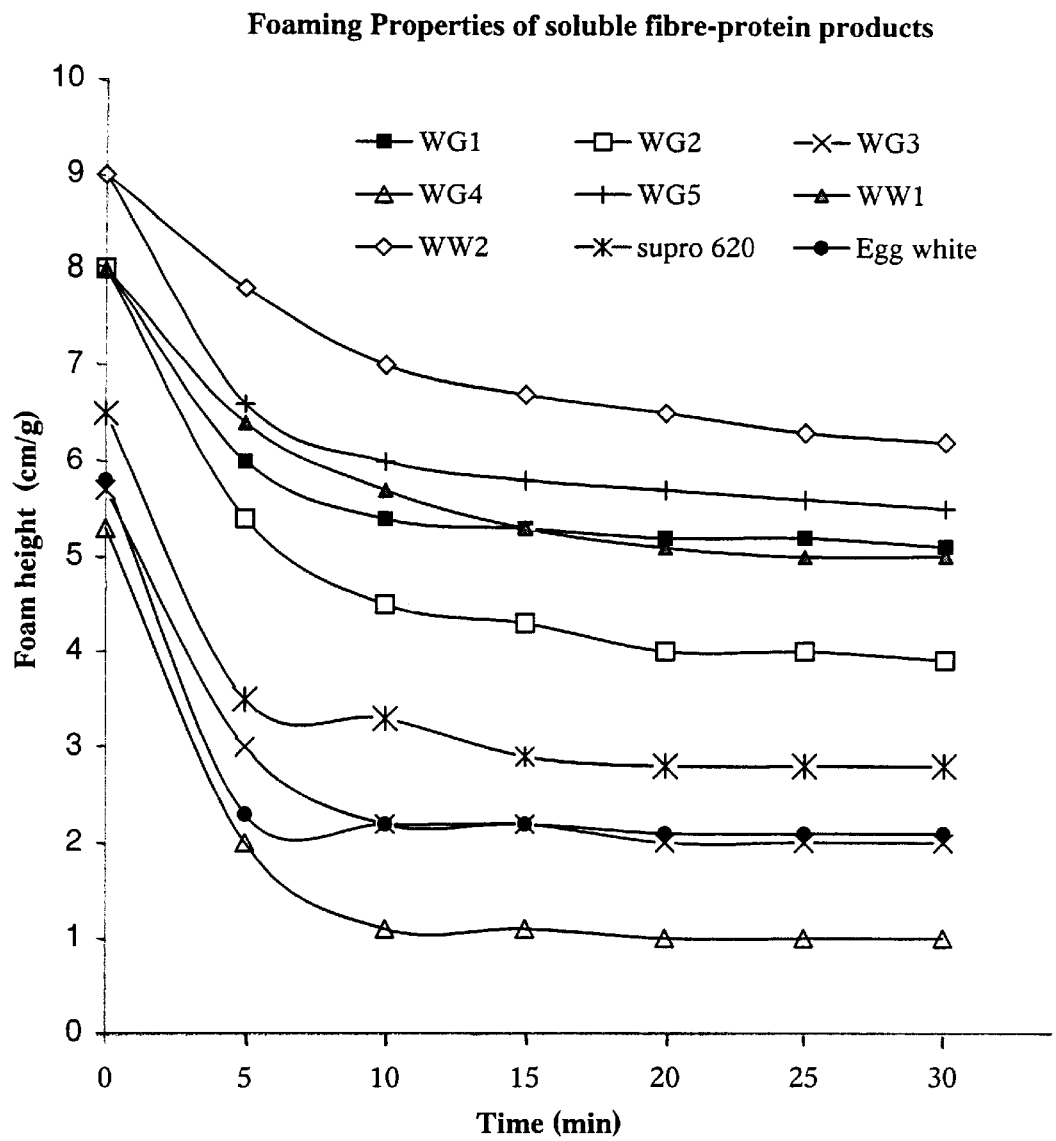

All products display excellent functional properties, i.e. high water solubility, oil emulsifying and foaming capacity, antioxidant activity, water absorption, thickening and gelling characteristics, These properties of the products generally compared well with or are better than those of two major protein isolates/concentrates, soy protein isolate Supro 620 and egg white concentrate (Table 3). The foaming properties are shown in FIGS. 15 and 16.

Figure 17:
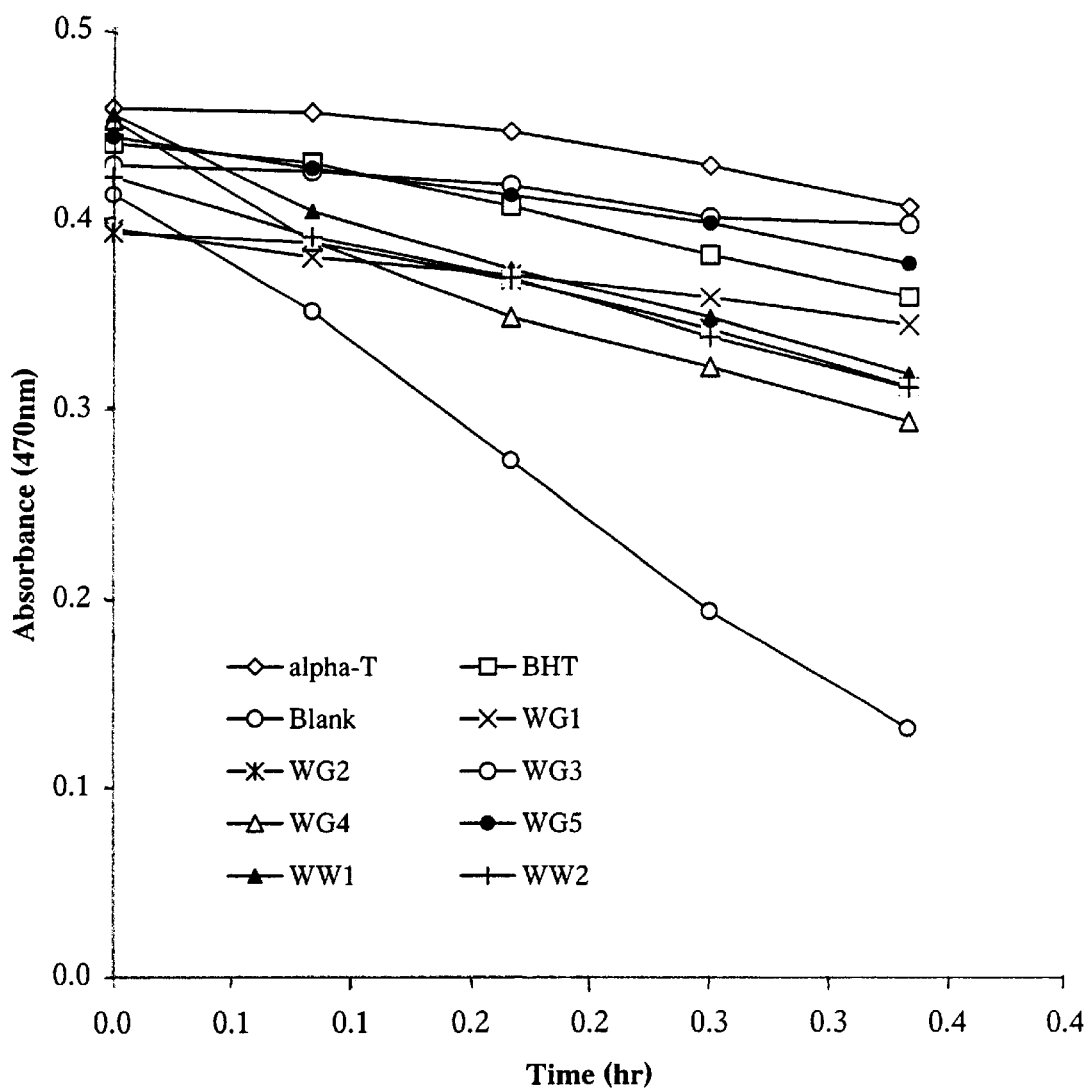
FIGS. 17 and 18 show graphically the antioxidant activity of soluble protein-fibre products produced in accordance with embodiments of the invention in comparison to alpha tocopherol, a synthetic antioxidant, butylated hydroxy toluene (BHT) and a soy bean protein isolate.
Figure 18:
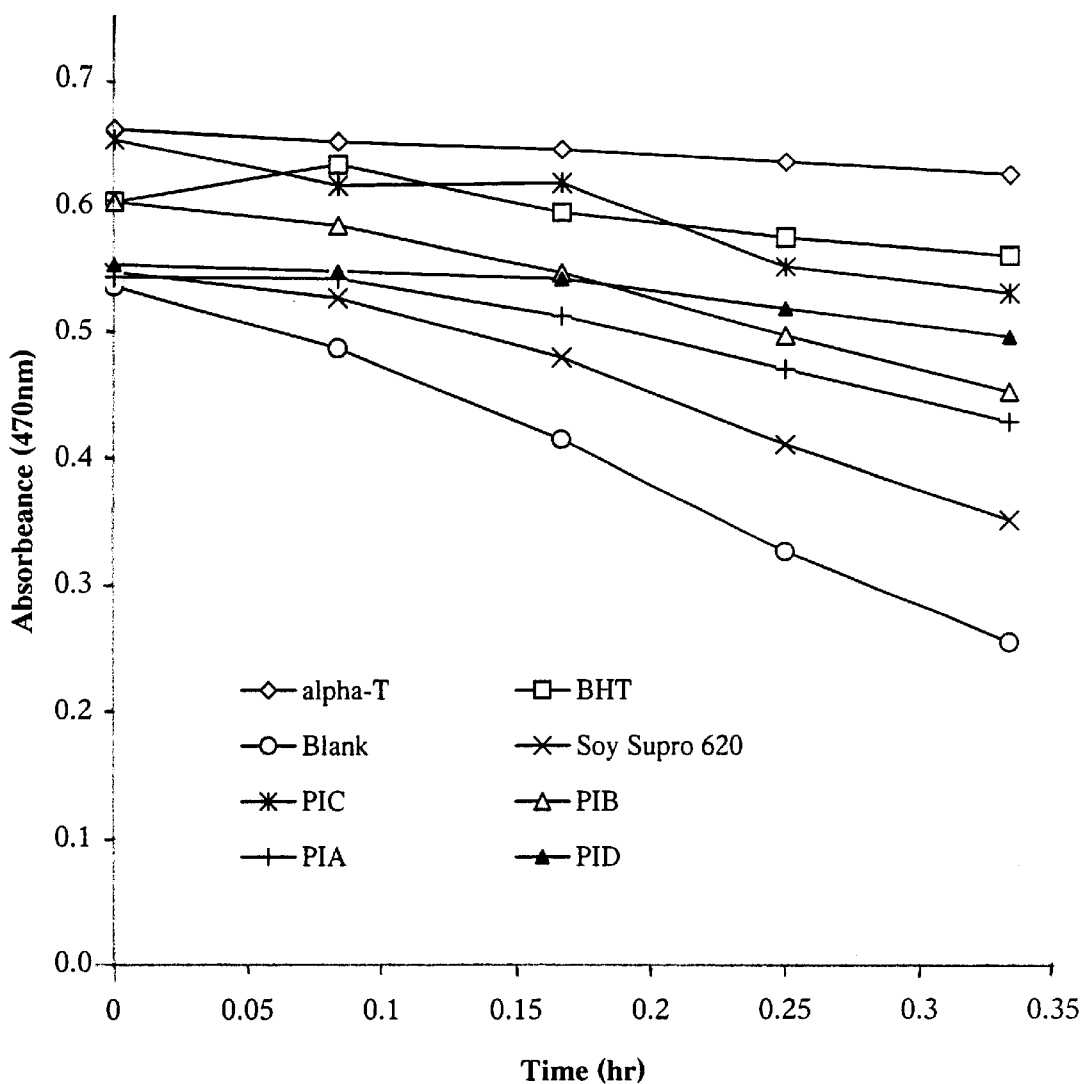

Specifically, the products have high solubility in water, a property required for many applications and a prerequisite for many other desirable properties, such as foaming and emulsification. They also possess high antioxidant activity by the beta-carotene bleaching method (ref. 11) as compared to an alpha-tocopherol standard solution. Compared to the commercially available, soyabean-derived Supra 620 protein concentrate, the products produced by the processes of the present invention have an antioxidant activity about 1.6 to 3.5 times higher than that of this high quality commercial product (Table 3; FIGS. 17, 18). Compelling evidence, accumulated in recent years, indicates that antioxidant nutrients reduce the risk of cancer, heart disease, cataracts and cognitive dysfunction and hence are beneficial.

The thickening capacity of the products are derived from the high degree of hydration of the fibre and protein molecules in water. Interestingly, the products generally display a shear-thickening effect (Table 3), suggesting their non-linear nature. In addition, the products have varying gelation temperatures from about 61° to 84° C. depending on the protein content of the products, but generally higher than those of soy Supro 620 and egg white concentrate (Table 3). Higher gelation temperatures of a product is advantageous in application systems that need pasteurization, since heat transfer is much faster in liquid than in semi-solid, gel systems. Gelation hinders heat transfer in food systems.

From a nutritional point of view, the products also have a better amino acid profile than wheat gluten proteins (see Tables 4 and 5). Particularly, the products seem to have a much higher lysine content than the whole wheat kernel which, like many other cereal and plant foods, lacks lysine. In addition, some of the products contain other amino acids, such as histidine, arginine, threonine, glycine and the essential amino acid isoleucine in higher concentration than wheat kernels and wheat flour.

In the Tables which follow:

Table 1 lists the enzymes used for the preparation of soluble protein-fibre products according to embodiments of the invention together with the optimum pH and temperature, the calcium requirement for each enzyme, and names of the suppliers;

Tables 2 and 3 show typical results of the physical, chemical and functional properties of the soluble fibre-protein products derived from wheat grain, distiller's solubles and Fibrotein centrate by the processes of the present invention and illustrated in FIGS. 1 to 12;

Table 4 gives the amino acid composition of four of the soluble protein-fibre products produced from wheat grain (WG5), distiller's solubles (SB2) and Fibrotein centrate (PIA and PID) according to the present invention. Particularly noteworthy is the high lysine content of the products of the invention, which is often the limiting essential amino acid in cereals and other protein isolates;

Table 5 comprises the amino acid contents of the soluble protein-fibre products produced from Fibrotein centrate (PlA and PlB) with the soluble wheat gluten (amino acid residues per $10^4$ g protein basis; and Table 6 illustrates a general categorization of the products obtainable according to the procedures of the invention in terms of protein and fibre contents.

SUMMARY OF DISCLOSURE

In summary of this disclosure, soluble protein-fibre materials are obtained from cereal grains free from other grain by-products, including starch, bran and gluten, by a combination of processing operations including enzymatic digestion of starch and ultrafiltration purification and concentration. It will be further understood that, although various features of the invention have been described with respect to one or another of the embodiments of the invention, the various features and embodiments of the invention may be combined or used in conjunction with other features and embodiments of the invention as described herein. Modifications are possible within the scope of the invention.

TABLE 1

Enzymes used for the preparation of soluble protein-fibre products together with their properties and names of suppliers.

| Enzyme | Optimum pH | Optimum Temperature (° C.) | Ca** requirement (ppm) | Supplier |
|---|---|---|---|---|
| α-Amylase |  |  |  |  |
| BAN | 5.0–7.0 | 70 | 300 | Novo |
| Liquozyme | 5.6 | 70–80 | very low/12 | Novo |
| Termamyl | 5.0–7.0 | 90 | 50–70 | Novo |
| Spezyme Delta AA[4] | 5.7–6.0 | 95 | low/20 | Genencor |
| Glucoamylase |  |  |  |  |
| Distillase[2] | 3.8–4.5 | 50–60 | no | Genencor |
| Spirizyme[3] | 3.5–5.0 | 60 |  | Novo |
| AMG | 4.0–5.0 | 70 |  | Novo |
| Hemicellulase |  |  |  |  |
| Shearzyme | 4.5–5.0 | 60–70 | no | Novo |
| Novozyme 348 | 6.0–8.0 | 50–60 |  | Novo |

[1]Recommended dosage 0.04–0.08%, w/w.
[2]2.6–5.3 U/100 mL (20% solids), or 0.3 L/tonne starch recommended by manufacturer.
[3]0.67–1.0 L/tonne starch recommended.

TABLE 2

Physical and chemical properties of water-soluble protein-fiber products manufactured from wheat and wheat by-product

| Raw material type | Product or std ID | Product label | Product density (g/mL) | L | a | b | 0 (hoe) | Protein content, (% as is) | Fiber content, % soluble (%) | Fiber content, % insoluble (%) | Total carbo-hydrate (%) | Fat content (%) | Ash (%) | Yield (g/kg wheat) | FIG. |
|---|---|---|---|---|---|---|---|---|---|---|---|---|---|---|---|
| wheat grain | WG1 | Aug/14/98 | 0.1 | 85.2 | −0.9 | 10.7 | 94.8 | 18.2 | 21.8 | 1.4 | 69.9 | 3.1 | 1.9 | 40.7 | 5 |
| wheat grain | WG2 | Aug/22/98 | 0.1 | 84.8 | −0.6 | 12.3 | 92.8 | 19.6 | 19.0 | 1.6 | 71.4 | 0.4 | 1.8 | 46.0 | 6 |
| wheat grain | WG3 | Oct/2/98[a] | 0.4 | 84.4 | −0.5 | 15.3 | 91.9 | 23.7 | — | — | — | — | — | 17.8 | 1 |
| wheat grain | WG4 | Oct/6/98[b] | 0.5 | 87.4 | −1.1 | 9.4 | 96.7 | 24.4 | 39.0 | 8.5 | 63.9 | 8.2 | 0.5 | 17.8 | 1 |
| wheat grain | WG5 | Oct/23/98 | 0.3 | 87.5 | −0.5 | 10.6 | 92.7 | 31.2 | 13.6 | <0.1 | 56.4 | 3.1 | 6.3 | 8.6 | 2 |
| wheat grain | WW1 | Oct/30/98 | 0.1 | 85.3 | −0.1 | 10.9 | 90.5 | 41.4 | 3.3 | 0.7 | 51.5 | 1.3 | 0.4 | 16.9 | 3 |
| wheat grain | WW2 | Oct/30/98S | 0.1 | 85.0 | −0.1 | 11.4 | 90.5 | 51.0 | 4.3 | 0.8 | 41.5 | 2.3 | 0.6 | 22.3 | 4 |
| beerstillage | SB1 | Dec7/98 | 0.1 | 84.7 | 0.1 | 10.0 | 89.4 | 34.0 | — | — | — | — | — | 37.4[c] | 7 |
| beerstillage | SB2 | Dec7/98S | 0.1 | 84.6 | 0.2 | 10.6 | 88.9 | 47.0 | — | — | — | — | — | 29.4[c] | 8 |
| centrate | PIA | 1/Apr14/98 | 0.2 | 83.8 | 0.8 | 13.0 | 86.5 | 24.1 | — | — | — | — | — | 33.6[d] | 9 |

TABLE 2-continued

Physical and chemical properties of water-soluble protein-fiber products manufactured from wheat and wheat by-product

| Raw material type | Product ID | Product or std Product label | Product density (g/mL) | Product color L | a | b | 0 (hoe) | Protein content, (% as is) | Fiber content, % soluble (%) | insoluble (%) | Total carbohydrate (%) | Fat content (%) | Ash (%) | Yield (g/kg wheat) | FIG. |
|---|---|---|---|---|---|---|---|---|---|---|---|---|---|---|---|
| centrate | PIB | 1/Apr15/98 | 0.4 | 84.1 | −0.3 | 12.3 | 91.4 | 31.0 | 34.6 | 11.1 | 53.7 | 10.3 | 0.9 | 32.0[d] | 10 |
| centrate | PIC | 1/Apr20/98 | 0.1 | 87.4 | −0.3 | 10.0 | 91.7 | 22.0 | 58.9 | 0.7 | 70.1 | 1.8 | <0.1 | 39.2[d] | 11 |
| centrate | PID | 1/Apr8/98 | 0.1 | 84.8 | 0.7 | 9.5 | 85.8 | 40.0 | — | — | — | — | — | 35.2[d] | 12 |
| soybean | Sopro 620 | | 0.3 | 87.5 | −1.1 | 14.4 | 94.4 | 87.5 | — | — | — | — | — | n/a | |
| hen egg | Egg white | | 0.4 | 93.3 | −3.8 | 14.0 | 105.2 | 82.7 | — | — | — | — | — | n/a | |

[a]Westfalia Separator was used for clarification
[b]Sorvall lab centrifuge was used for clarification
[c]Based on the assumption that 30% of wheat solids turns into stillage that can be fractionated by volume into 60% supernatant that in turn contains 80% solids
[d]Calculated based on the asumption that the Fibrotein centrate contains 18% solids and accounts for 80% of the wheat solids

TABLE 3

Functional properties of water-soluble protein-fiber products manufactured from wheat and wheat by-product

| Product or std ID | Product label | Protein content, (% as is) | Solubility in water (g/100 g) | Emulsifying capacity[e] (mL/g) | Emulsion activity at 1% $A_{500}$ | Foaming capacity (mm/g) | Foaming stability (%) | Antioxidant (AE, %) | Water absorption (mL/100 g) | Viscosity[c] at 2% conc. (mPa s) | Gelation temp. (° C.) | conc[g] (%) |
|---|---|---|---|---|---|---|---|---|---|---|---|---|
| WG1 | Aug/14/98 | 17.8 | 97.5 | 114 | 0.98 | 594 | 85 | 118 | 183 | 2.3–4.5 | 72 | 25 |
| WG2 | Aug/22/98 | 19.6 | 96.9 | 121 | 0.90 | 539 | 72 | 97 | 174 | 2.9–5.2 | 82 | 14 |
| WG3 | Oct/2/98[a] | 23.7 | 97.3 | 127 | 1.34 | 296 | 67 | 95 | 283 | 1.2–1.1 | 65 | 14 |
| WG4 | Oct/6/98[b] | 24.4 | 84.1 | 136 | 1.23 | 200 | 50 | 81 | 243 | 1.1–1.0 | 71 | 14 |
| WG5 | Oct/23/98 | 31.2 | 97.1 | 120 | 1.19 | 652 | 83 | 92 | 75 | 1.2–2.0 | 77 | 35 |
| WW1 | Oct/30/98 | 41.4 | 98.9 | 133 | 0.62 | 634 | 78 | 69 | 76 | 1.5–2.4 | 84 | 20 |
| WW2 | Oct/30/98S | 51.0 | 98.9 | 135 | 0.41 | 767 | 79 | 76 | 51 | 0.9–1.6 | 84 | 35 |
| SB1 | Dec7/98 | 30.9 | 98.7 | 152 | 0.58 | 575 | 38 | 109 | 172 | 3.6–6.0 | 80 | 14 |
| SB2 | Dec7/98S | 51.4 | 99.6 | 160 | 0.63 | 653 | 79 | 91 | 38 | 2.5–3.9 | 72 | 35 |
| PIA | 1/Apr14/98 | 24.1 | 98.0 | 131 | 0.65 | 610 | 64 | 67 | 301 | 8.0–9.0 | 68 | 14 |
| PIB | 1/Apr15/98 | 31.0 | 89.0 | 161 | 1.21 | 180 | 83 | 53 | 199 | 3.0–5.0 | 77 | 14 |
| PIC | 1/Apr21/98 | 22.0 | 98.0 | 126 | 0.63 | 640 | 55 | 66 | 185 | 4.0–6.0 | 80 | 14 |
| PID | 4/Apr8/98 | 40.0 | 100.0 | 146 | 1.23 | 700 | 73 | 91 | 311 | 6.0–7.0 | 61 | 14 |
| Sopro 620 | | 87.5 | 24.5 | 131 | 0.54 | 325 | 85 | 34 | 574 | 4.0–5.0 | 59 | 14 |
| Egg white | | 82.7 | 95.6 | 173 | 1.40 | 228 | 91 | 59 | n/d | 8.0–4.0 | 62 | 14 |

[a]Westfalia Separator was used for clarification
[b]Sorvall lab centrifuge was used for clarification
[c]Average of two replicates
[d], not determined: n/a, not applicable
[e]Viscosity values of shear thickening or thinning correspond to shear stress range of 0.1-1 Pa
[g]Dispesion
[h]Standard of Tocophenol 100 mg/Liter in methanol

TABLE 4

Amino acid composition (mg/100 g) of four water-soluble protein-fibre products produced from wheat distiller's solubles and fibrotein centrate according to the present invention.

| Amino acid | WG5 | PIA | PID | SB2 |
|---|---|---|---|---|
| Alanine | 1280 | 100 | 855 | 956 |
| Arginine | 989 | 780 | 2125 | 2130 |
| Aspartic acid | 1030 | 385 | 915 | 895 |
| Cystine | 620 | <50 | <50 | 819 |
| Glutamic acid | 10600 | 5025 | 8950 | 6630 |
| Glycine | 1990 | 960 | 2250 | 2630 |
| Histidine | 1390 | 100 | 405 | 2070 |
| Isoleucine | 638 | 1340 | 2345 | 728 |
| Leucine | 1140 | 200 | 595 | 1300 |
| Lysine | 409 | 10900 | 10400 | 791 |
| Methionine | 390 | 50 | 150 | 350 |
| Phenylalanine | 815 | 530 | 1490 | 1510 |
| Proline | 3390 | 1400 | 3250 | 3460 |
| Serine | 1290 | 720 | 1700 | 1610 |
| Threonine | 1740 | 1250 | 2520 | 1400 |
| Tryptophan | 1730 | 105 | 290 | 228 |

TABLE 4-continued

Amino acid composition (mg/100 g) of four water-soluble protein-fibre products produced from wheat distiller's solubles and fibrotein centrate according to the present invention.

| Amino acid | WG5 | PIA | PID | SB2 |
|---|---|---|---|---|
| Tyrosine | 765 | 380 | 1200 | 1400 |
| Valine | 1100 | 190 | 795 | 1090 |

TABLE 5

Comparison of the amino acids contents of two soluble protein isolates with (P1A and P1B) insoluble wheat gluten (amino acid residues per $10^4$ g protein basis)

| | Proteins | | |
|---|---|---|---|
| Amino Acid | P1A | P1B | Gluten[1] |
| Alanine | 05 | 3.1 | 3.0 |
| Arginine | 2.0 | 3.9 | 2.0 |
| Aspartic acid | 1.3 | 2.2 | 2.2 |
| Cystein/2 | <0.5 | <0.03 | 1.4 |
| Glutamic acid | 15.5 | 19.6 | 29.0 |
| Glycine | 5.8 | 9.7 | 4.7 |
| Histidine | 0.3 | 0.8 | 1.5 |
| Isoleucine | 4.6 | 5.8 | 3.3 |
| Leucine | 0.7 | 1.5 | 5.9 |
| Lysine | 33.9 | 22.9 | 0.9 |
| Methionine | 0.2 | 0.3 | 1.2 |
| Phenylalanine | 1.5 | 2.9 | 3.2 |
| Proline | 5.5 | 9.1 | 13.7 |
| Serine | 3.1 | 5.2 | 4.0 |
| Threonine | 4.8 | 6.8 | 2.1 |
| Tryptophan | 0.2 | 0.5 | 0.6 |
| Tyrosine | 1.0 | 2.1 | 2.0 |
| Valine | 0.7 | 2.2 | 4.5 |

[1]Data of Wu and Dimler (1963). Arch. Biochm. Biophys. 102:203

TABLE 6

| Product Category | Protein Content (%) | Fibre Content (%) |
|---|---|---|
| High protein-high fibre | ≧30 | ≧30 |
| High protein-low fibre | ≧30 | ≦10 |
| Low protein-high fibre | ≦10 | ≦30 |
| Low protein-low fibre | ≦10 | ≦10 |

REFERENCES

1. Mazza, G. 1998. Functional Foods: Biochemical and Processing Aspects. Technomic Publishing Co., Inc., Lancaster, Pa. p. 460.
2. Sampson, D. A., L. A. Eckoff, S. L. Yan and K. Lorenz. 1995. Analysis of free and glycosylated vitamin B6 in wheat by high-performance liquid chromatography. Cereal Chem. 72: 217–221.
3. Zhou, J. R. and J. W. Erdman. 1995. Phytic acid in health and disease. Crit. Rev. Food Ser. Nutri. 35: 495–508.
4. Wrigley, C. W. 1996. Gluten '96. Proceedings of the Sixth International Workshop. Royal Australian Chemical Institute, Victoria, Australia. p. 544.
5. Faurot, A.-L., Saulnier, L., Berot, S., Popineau, Y., Petit, M.-D., Rouau, X., and Thibault, J.-F. 1995. Large scale isolation of water-soluble and water insoluble pentosans from wheat flour. Lebensm. Wiss. Technol. 28:436–441.
6. Oomah, B. D, and Mathieu, J. J. 1988. Functionality of commercially produced wheat flour solubles in cakes, cookies, and wieners. J. Food Sci. 53:1787–1791.
7. Hoseney, R. C. 1986. Cereal Starch. Pate 33 to 68 in Principles of Cereal Science and Technology, American Assoc. Cereal Chem., St. Paul, Minn.
8. Dubois, M., Gilles, K. A., Hamilton, J. K., Rebers, P. A., and Smith, F. 1956. Colorimetric method for determination of sugars and related substances. Anal. Chem. 28:350–356.
9. Harland, P. D. 1989. Experimental Design in Biotechnology. Marcel Dekker, New York. p.243.
10. Laemmli, U. K. 1970. Cleavage of structural proteins during the assembly of the head of bacteriophage T4. Nature 227:680–685.
11. Velioglu, Y. S., G. Mazza, L. Gao and B. D. Oomah. 1998. Antioxidant activity and total phenolics in selected fruits, vegetables and grain products. J. Agric. Food Chem. 46(10):4113–4117.

What is claimed is:

1. A water-soluble free-flowing protein product isolated from a cereal grain and substantially free from starch and bran and low molecular weight degradation products thereof, which is characterized by:

a protein content of about 15 to about 60 wt %;

a dietary fibre content of 0 to about 65 wt %;

a solubility in water at 20° to 25° C. of from about 80 to 100%;

a gelation temperature of at least about 50° C.; and a molecular weight as determined by SDS-PAGE of less than about 40 kDa.

2. The protein product of claim 1 further characterized by:

a viscosity (determined as a 2% aqueous solution) of about 1 to about 10 Pa;

a foaming capacity of about 150 to about 800 mm/g;

a foaming stability of about 35 to about 90%;

an emulsifying capacity of about 135 to about 165 mL/g;

an antioxidant activity of about 50 to about 120%;

a water absorption of about 35 to about 325 mL/100 g;

a fat content of less than about 1%; and a moisture content of less than about 10 wt %.

3. The protein product of claim 2 having a cream colour and bland taste and having a particle size such that at least about 40 wt % passes a 100 mesh screen.

4. The protein product of claim 1 exhibiting major protein bands at about 20 and about 33 kDa on an SDS-PAGE gel.

5. The protein product of claim 1 exhibiting major protein bands at about 27, 29 and 30 k.Da on an SDS-PAGE gel.

6. The protein product of claim 1 exhibiting a single major protein band at about 20 kDa on an SDS-PAGE gel.

* * * * *